US012634300B1

(12) United States Patent
Salji et al.

(10) Patent No.: US 12,634,300 B1
(45) Date of Patent: May 19, 2026

(54) ACTIVE EXTENSION OF A THREAT INTELLIGENCE SHARING SERVICE

(71) Applicant: Darktrace Holdings Limited, Cambridge (GB)

(72) Inventors: Carl Salji, Bedford (GB); Jake Lal, Cambridge (GB); John Boyer, Cambridge (GB); Andres Martin, Cambridge (GB)

(73) Assignee: Darktrace Holdings Limited, Cambridge (GB)

( * ) Notice: Subject to any disclaimer, the term of this patent is extended or adjusted under 35 U.S.C. 154(b) by 229 days.

(21) Appl. No.: 18/207,064

(22) Filed: Jun. 7, 2023

Related U.S. Application Data

(60) Provisional application No. 63/350,781, filed on Jun. 9, 2022.

(51) Int. Cl.
*H04L 9/40* (2022.01)
*H04L 41/16* (2022.01)

(52) U.S. Cl.
CPC .......... *H04L 63/1416* (2013.01); *H04L 41/16* (2013.01); *H04L 63/1458* (2013.01)

(58) Field of Classification Search
CPC ............. H04L 63/1416; H04L 63/1441; H04L 63/1458; H04L 41/16
See application file for complete search history.

(56) References Cited

U.S. PATENT DOCUMENTS

| | | | |
|---|---|---|---|
| 6,154,844 | A | 11/2000 | Touboul et al. |
| 6,965,968 | B1 | 11/2005 | Touboul |
| 7,307,999 | B1 | 12/2007 | Donaghey |

(Continued)

FOREIGN PATENT DOCUMENTS

| | | |
|---|---|---|
| EP | 2922268 A1 | 9/2015 |
| WO | 2001031420 A2 | 5/2001 |

(Continued)

OTHER PUBLICATIONS

Abdallah Abbey Sebyala et al., "Active Platform Security through Intrusion Detection Using Naive Bayesian Network for Anomaly Detection," Department of Electronic and Electrical Engineering, 5 pages, University College London, Torrington Place, England, United Kingdom.

(Continued)

*Primary Examiner* — Nam T Tran
(74) *Attorney, Agent, or Firm* — Rutan and Tucker, LLP

(57) ABSTRACT

A cyber security appliance and computerized method for detecting and disabling malicious endpoints is described. Upon receiving information associated with one or more endpoints including a first endpoint, the cyber security appliance determines, based on conducting analytics on a portion of the information by a cyber security appliance, whether the first endpoint constitutes a malicious endpoint. In response to detecting the malicious endpoint, the cyber security appliance requests authorization to launch an offensive countermeasure against the malicious endpoint and, upon receiving the authorization, conducts the offensive countermeasure against the malicious endpoint by at least continuously disrupting or disabling communications over a network utilized by the malicious endpoint.

19 Claims, 9 Drawing Sheets

(56) References Cited

U.S. PATENT DOCUMENTS

| | | | |
|---|---|---|---|
| 7,418,731 | B2 | 8/2008 | Touboul |
| 7,448,084 | B1 | 11/2008 | Apap et al. |
| 8,312,540 | B1 | 11/2012 | Kahn et al. |
| 8,819,803 | B1 | 8/2014 | Richards et al. |
| 8,879,803 | B2 | 11/2014 | Ukil et al. |
| 8,966,036 | B1 | 2/2015 | Asgekar et al. |
| 9,043,905 | B1 | 5/2015 | Allen et al. |
| 9,106,687 | B1 | 8/2015 | Sawhney et al. |
| 9,185,095 | B1 | 11/2015 | Moritz et al. |
| 9,213,990 | B2 | 12/2015 | Adjaoute |
| 9,401,925 | B1 | 7/2016 | Guo et al. |
| 9,516,039 | B1 | 12/2016 | Yen et al. |
| 9,516,053 | B1 | 12/2016 | Muddu et al. |
| 9,641,544 | B1 | 5/2017 | Treat et al. |
| 9,712,548 | B2 | 7/2017 | Shmueli et al. |
| 9,727,723 | B1 | 8/2017 | Kondaveeti et al. |
| 9,807,092 | B1 * | 10/2017 | Gutzmann .......... H04L 63/1458 |
| 10,043,006 | B2 | 8/2018 | Puri et al. |
| 10,237,287 | B1 * | 3/2019 | Amidon .............. H04L 63/1416 |
| 10,268,821 | B2 | 4/2019 | Stockdale et al. |
| 10,419,466 | B2 | 9/2019 | Ferguson et al. |
| 10,701,093 | B2 | 6/2020 | Dean et al. |
| 11,057,409 | B1 * | 7/2021 | Bisht ................... H04L 63/1441 |
| 2002/0186698 | A1 | 12/2002 | Ceniza |
| 2003/0070003 | A1 | 4/2003 | Chong et al. |
| 2004/0054925 | A1 * | 3/2004 | Etheridge .......... H04L 63/1458 |
| | | | 709/224 |
| 2004/0083129 | A1 | 4/2004 | Herz |
| 2004/0167893 | A1 | 8/2004 | Matsunaga et al. |
| 2005/0065754 | A1 | 3/2005 | Schaf et al. |
| 2007/0118909 | A1 | 5/2007 | Hertzog et al. |
| 2007/0294187 | A1 | 12/2007 | Scherrer |
| 2008/0005137 | A1 | 1/2008 | Surendran et al. |
| 2008/0109730 | A1 | 5/2008 | Coffman et al. |
| 2009/0106174 | A1 | 4/2009 | Battisha et al. |
| 2009/0254971 | A1 | 10/2009 | Herz et al. |
| 2010/0009357 | A1 | 1/2010 | Nevins et al. |
| 2010/0071054 | A1 * | 3/2010 | Hart ................... H04L 63/1416 |
| | | | 713/153 |
| 2010/0095374 | A1 | 4/2010 | Gillum et al. |
| 2010/0125908 | A1 | 5/2010 | Kudo |
| 2010/0235908 | A1 | 9/2010 | Eynon et al. |
| 2010/0299292 | A1 | 11/2010 | Collazo |
| 2011/0093428 | A1 | 4/2011 | Wisse |
| 2011/0213742 | A1 | 9/2011 | Lemmond et al. |
| 2011/0261710 | A1 | 10/2011 | Chen et al. |
| 2012/0096549 | A1 | 4/2012 | Amini et al. |
| 2012/0137367 | A1 | 5/2012 | Dupont et al. |
| 2012/0209575 | A1 | 8/2012 | Barbat et al. |
| 2012/0210388 | A1 | 8/2012 | Kolishchak |
| 2012/0210434 | A1 * | 8/2012 | Curtis ................. H04L 63/1441 |
| | | | 726/25 |
| 2012/0284791 | A1 | 11/2012 | Miller et al. |
| 2012/0304288 | A1 | 11/2012 | Wright et al. |
| 2013/0091539 | A1 | 4/2013 | Khurana et al. |
| 2013/0198119 | A1 | 8/2013 | Eberhardt, III et al. |
| 2013/0198840 | A1 | 8/2013 | Drissi et al. |
| 2013/0254885 | A1 | 9/2013 | Devost |
| 2014/0007237 | A1 | 1/2014 | Wright et al. |
| 2014/0074762 | A1 | 3/2014 | Campbell |
| 2014/0165207 | A1 | 6/2014 | Engel et al. |
| 2014/0215618 | A1 | 7/2014 | Amit |
| 2014/0283064 | A1 * | 9/2014 | Fraize ................. H04L 63/1416 |
| | | | 726/23 |
| 2014/0325643 | A1 | 10/2014 | Bart et al. |
| 2015/0067835 | A1 | 3/2015 | Chari et al. |
| 2015/0081431 | A1 | 3/2015 | Akahoshi et al. |
| 2015/0161394 | A1 | 6/2015 | Ferragut et al. |
| 2015/0163121 | A1 | 6/2015 | Mahaffey et al. |
| 2015/0172300 | A1 | 6/2015 | Cochenour |
| 2015/0180893 | A1 | 6/2015 | Im et al. |
| 2015/0213358 | A1 | 7/2015 | Shelton et al. |
| 2015/0286819 | A1 | 10/2015 | Coden et al. |
| 2015/0310195 | A1 | 10/2015 | Bailor et al. |
| 2015/0319185 | A1 | 11/2015 | Kirti et al. |
| 2015/0341379 | A1 | 11/2015 | Lefebvre et al. |
| 2015/0363699 | A1 | 12/2015 | Nikovski |
| 2015/0379110 | A1 | 12/2015 | Marvasti et al. |
| 2016/0062950 | A1 | 3/2016 | Brodersen et al. |
| 2016/0078365 | A1 | 3/2016 | Baumard |
| 2016/0094427 | A1 * | 3/2016 | Talat ...................... H04L 69/16 |
| | | | 709/250 |
| 2016/0149941 | A1 | 5/2016 | Thakur et al. |
| 2016/0164902 | A1 | 6/2016 | Moore |
| 2016/0173509 | A1 | 6/2016 | Ray et al. |
| 2016/0241576 | A1 | 8/2016 | Rathod et al. |
| 2016/0261621 | A1 | 9/2016 | Srivastava et al. |
| 2016/0352768 | A1 | 12/2016 | Lefebvre et al. |
| 2016/0373476 | A1 | 12/2016 | Dell'Anno et al. |
| 2017/0063907 | A1 | 3/2017 | Muddu et al. |
| 2017/0063910 | A1 | 3/2017 | Muddu et al. |
| 2017/0063911 | A1 | 3/2017 | Muddu et al. |
| 2017/0118236 | A1 | 4/2017 | Devi Reddy |
| 2017/0169360 | A1 | 6/2017 | Veeramachaneni et al. |
| 2017/0220801 | A1 | 8/2017 | Stockdale et al. |
| 2017/0230391 | A1 | 8/2017 | Ferguson et al. |
| 2017/0230392 | A1 | 8/2017 | Stockdale |
| 2017/0251012 | A1 | 8/2017 | Stockdale et al. |
| 2017/0262633 | A1 | 9/2017 | Miserendino et al. |
| 2017/0270422 | A1 | 9/2017 | Sorakado |
| 2017/0279775 | A1 * | 9/2017 | Savolainen ......... H04L 63/0421 |
| 2018/0027006 | A1 | 1/2018 | Zimmermann et al. |
| 2018/0052993 | A1 | 2/2018 | Jou et al. |
| 2018/0167402 | A1 | 6/2018 | Scheidler et al. |
| 2018/0234435 | A1 | 8/2018 | Cohen et al. |
| 2018/0324207 | A1 | 11/2018 | Reybok, Jr. et al. |
| 2018/0359264 | A1 * | 12/2018 | Sweet ................. H04L 63/1416 |
| 2019/0044963 | A1 | 2/2019 | Rajasekharan et al. |
| 2019/0124099 | A1 * | 4/2019 | Matselyukh ........ H04L 63/1416 |
| 2019/0260783 | A1 | 8/2019 | Humphrey et al. |
| 2020/0244673 | A1 | 7/2020 | Stockdale et al. |
| 2020/0358792 | A1 * | 11/2020 | Bazalgette .......... H04L 63/1416 |
| 2021/0127395 | A1 | 4/2021 | Zhang et al. |
| 2022/0394058 | A1 * | 12/2022 | Meunier ............. H04L 63/1441 |

FOREIGN PATENT DOCUMENTS

| | | |
|---|---|---|
| WO | 2008121945 A2 | 10/2008 |
| WO | 2013053407 A1 | 4/2013 |
| WO | 2014088912 A1 | 6/2014 |
| WO | 2015027828 A1 | 3/2015 |
| WO | 2016020660 A1 | 2/2016 |

OTHER PUBLICATIONS

Marek Zachara et al., "Detecting Unusual User Behavior to Identify Hijacked Internet Auctions Accounts," Lecture Notes in Computer Science, 2012, vol. 7465, Springer, Berlin, Heidelberg, Germany.

The United States Patent Office, Non-Final Office Action, May 20, 2021, 27 pages.

The United States Patent Office, Non-Final Office Action, Sep. 22, 2022, 17 pages.

The United States Patent Office, Final Office Action, Mar. 18, 2022, 19 pages.

Li Zhou, et al: "Operational Security Log Analytics for Enterprise Breach detection", 2016 IEEE Cybersecurity Development (Serdev) IEE, Nov. 3, 2016, p. 15-22.

European Patent Office, "European search Report," 10 pages, Jul. 10, 2019.

* cited by examiner

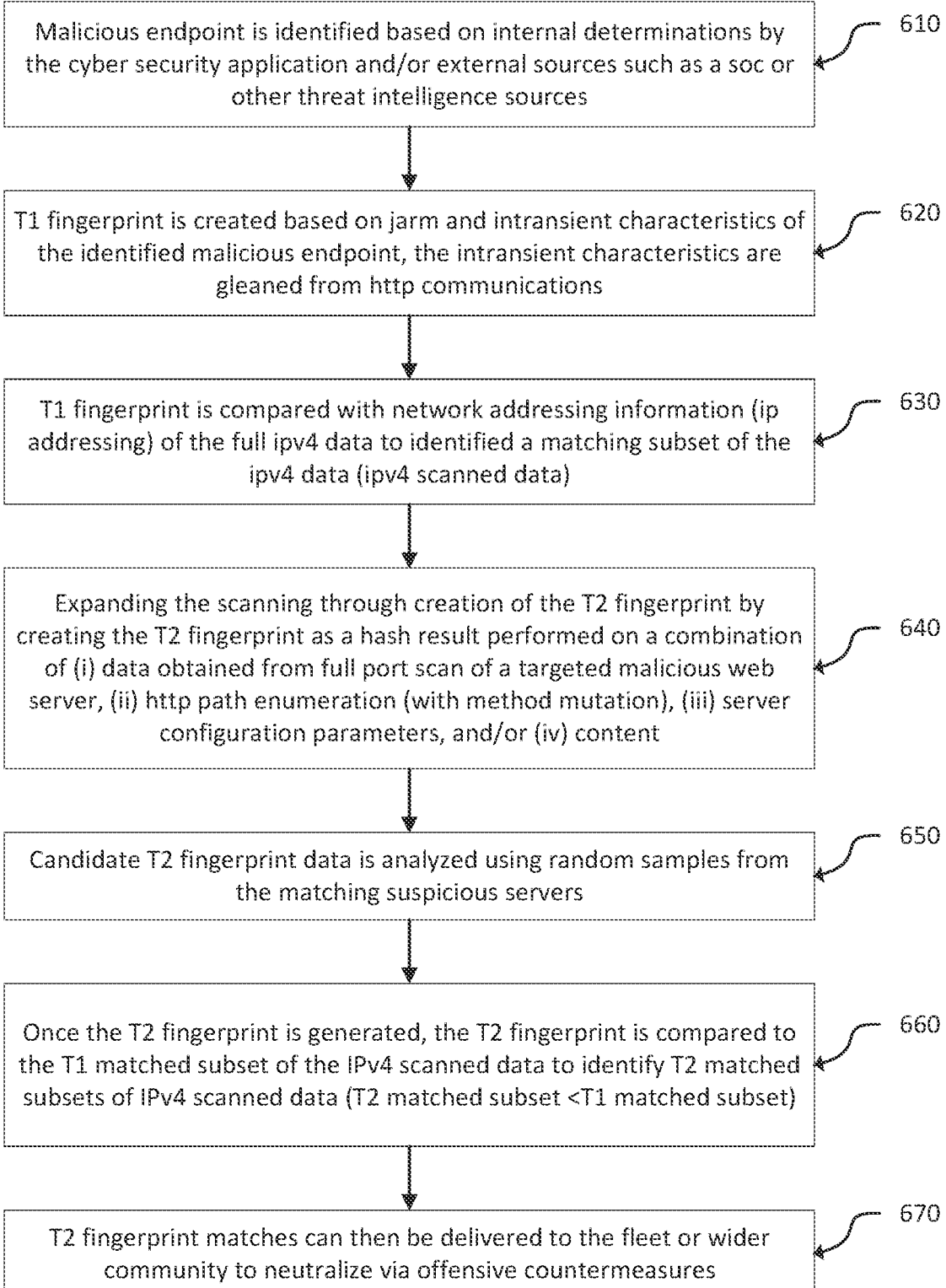

Malicious endpoint is identified based on internal determinations by the cyber security application and/or external sources such as a soc or other threat intelligence sources    610

T1 fingerprint is created based on jarm and intransient characteristics of the identified malicious endpoint, the intransient characteristics are gleaned from http communications    620

T1 fingerprint is compared with network addressing information (ip addressing) of the full ipv4 data to identified a matching subset of the ipv4 data (ipv4 scanned data)    630

Expanding the scanning through creation of the T2 fingerprint by creating the T2 fingerprint as a hash result performed on a combination of (i) data obtained from full port scan of a targeted malicious web server, (ii) http path enumeration (with method mutation), (iii) server configuration parameters, and/or (iv) content    640

Candidate T2 fingerprint data is analyzed using random samples from the matching suspicious servers    650

Once the T2 fingerprint is generated, the T2 fingerprint is compared to the T1 matched subset of the IPv4 scanned data to identify T2 matched subsets of IPv4 scanned data (T2 matched subset <T1 matched subset)    660

T2 fingerprint matches can then be delivered to the fleet or wider community to neutralize via offensive countermeasures    670

FIGURE 6

ACTIVE EXTENSION OF A THREAT INTELLIGENCE SHARING SERVICE

RELATED APPLICATION

This application claims priority under 35 USC 119 to U.S. Provisional patent application No. 63/350,781 entitled "AN AI CYBER SECURITY SYSTEM" filed Jun. 9, 2022, the contents of which is incorporated herein by reference in its entirety.

NOTICE OF COPYRIGHT

FIELD

Cyber security and an embodiment for use in detecting malicious endpoints and conducting offensive actions to disable the detected malicious endpoints.

BACKGROUND

Cybersecurity attacks have become a pervasive problem for enterprises as many computing devices and other resources have been subjected to attack and compromised. A "cyberattack" constitutes a threat to security of an enterprise (e.g., enterprise network, one or more computing devices connected to the enterprise network, or the like). As an example, the cyberattack may be a cybersecurity threat against the enterprise network, one or more computing devices connected to the enterprise network, stored or in-flight data accessible over the enterprise network, and/or other enterprise-based resources. This security threat may involve malware (malicious software) introduced into a computing device or into the network. The security threat may originate from an external endpoint or an internal entity (e.g., a negligent or rogue authorized user). The security threats may represent malicious or criminal activity, ranging from theft of credential to even a nation-state attack, where the source initiating or causing the security threat is commonly referred to as a "malicious" source.

Conventional cybersecurity products are commonly used to detect and prioritize cybersecurity threats (hereinafter, "cyber threats") against the enterprise, and to determine preventive and/or remedial actions for the enterprise in response to those cyber threats. The responses include defensive actions such as alerts, blocking further incoming communications with a "malicious" endpoint such as a malicious HyperText Transfer Protocol (HTTP) server for example. However, there is no actions conducted, in real-time, to disable or substantially limit (e.g., continuously disrupt) operations of the malicious HTTP server to other potential targets with the enterprise or outside the enterprise. Instead, malicious HTTP servers tend to be disabled after distribution of threat intelligence publications to a host provider, which may take numerous hours or days during which the malicious server will continue to distribute malware with impunity.

There is a pending need for a cyber security appliance configured to perform active measures to disable a malicious HTTP server immediately upon identification in efforts to protect an entire global community while also significantly reducing the temporal window of opportunity for the malicious actor.

SUMMARY

Methods, systems, and apparatus are disclosed for conducting an offensive countermeasure to disable or continuously disrupt network communications for one or more malicious endpoints used by a malicious actor, such as a malicious HTTP server (hereinafter, "malicious server"). According to one embodiment of the disclosure, this countermeasure may be an additional function performed by an inoculation module deployed as part of a cyber security appliance (referred to as an "inoculation extension"). The inoculation module (and thereby the inoculation extension) is deployed as a module of an AI-based autonomous response component.

More specifically, the AI-based autonomous response component may be configured to send a message to a cyber security professional (e.g., enterprise security administrator, third-party cyber security entity, etc.) requesting authorization to launch an offensive countermeasure against a malicious server. The authorization may be granted by a cyber security professional or a group of cyber security professionals, an industry-based or governmental agency, or any resource to confirm that offensive countermeasure is warranted. Upon receipt of the authorization, further operations may be conducted to perform the offensive countermeasure such as fingerprint generation and gathering of information for use in establishing communication sessions with the malicious server. As a result, the customer has an ability to fight back against malicious actors in real-time (e.g., within a few minutes) after detection of the cyber threat or an on-going malicious attack.

Herein, the cyber security appliance is configured to perform offensive countermeasures such as attempting to disable operability of one or more malicious servers after identification. One type of offensive countermeasure may include, but is not limited or restricted to, a Denial-of-Service (DoS) attack on the malicious server by exhausting its available sockets, which are generally considered as physical and/or logical server connection points. The DoS attack is intended to establish and maintain active communications sessions (connections) with the malicious server, with no intent of releasing the communication sessions. As a result, by connecting with all (or most) of the sockets, operations of the malicious server are disabled (or disrupt) as the malicious server will not be able to fully service requests from unsuspected targeted devices.

During the DoS attack, a maximum throughput of less than 500 kilobytes per second (kbps) is maintained. Given the low throughput, the DoS attack may be launched through an anonymity router.

According to one embodiment of the disclosure, the inoculation extension operates in a master-slave component configuration, where the master is provided network addressing information such uniform resource locators (URLs) associated with one or more identified malicious servers. The master may be configured to distribute the URLs across a number of slaves to establish successive communication sessions with a malicious server until a connection denial is received, which denotes that no further communications with the malicious server are permitted. Alternatively, each URL may be distributed to a particular slave, where the slave is responsible for establishing and maintaining connections with a malicious server associated with that URL. The slave continues to establish connections until a connection denial message is received from the malicious server. As yet another embodiment of the disclosure, the URLs may be distributed to the slaves based on server type (e.g., certain slaves are configured to handle certain server types), geography, or the like. Each slave may be a computing device or a software instance configured to establish a communication session with a socket of the malicious server or multiple sockets, and collectively, the slaves maintain the communication sessions through low-throughput data exchanges.

For this embodiment, the master-slave configuration for the inoculation extension is capable of simultaneously disabling approximately sixty targeted malicious servers. The DoS attack initiated by the inoculation extension is generally instantaneous, with recovery which may occur tens of seconds after stopping the DoS attack.

In summary, a plurality of operations are conducted by components within the cyber security appliance to initiate an offensive countermeasure to attempt to disable or continuously disrupt network connection availability for one or more malicious servers. The operations may involve a nomination process to request authorization to conduct offensive countermeasures on a potential malicious server identified by an AI-based autonomous detection component deployed within the cyber security appliance. The operations may further involve a fingerprint generation process to generate a fingerprint to identify the malicious server and other servers derived from or associated with the malicious server; a confirmation process to verify network addressing information associated with servers identified through a scanning process marches the generated fingerprint; and a disablement process to disable operability of the malicious server or malicious servers.

Herein, the nomination process is in response to operations conducted by the AI-based autonomous detect component, which is configured to identify a malicious server based on its behavior. Upon determination of malicious actions performed by the potential malicious server, a nomination module of the AI-based autonomous response component is configured to (i) send a message to a cyber security professional requesting authorization to launch an offensive countermeasure against the malicious server and (ii) await authorization to conduct the offensive countermeasure. Upon receipt of the authorization, a confirmation module utilizes a fingerprint module to perform operations to generate a fingerprint directed to the malicious server. The fingerprint may be used to identify and confirm network address information associated with a malicious server and may be applicable for identifying servers related to the malicious server. This ensures that similarly situated malicious servers governed by a bad actor are collectively disabled. Lastly, the disablement module, included as part of the inoculation extension, is configured to perform the offensive countermeasure to disable or disrupt network connectivity availability for the malicious server.

These and other features of the design provided herein can be better understood with reference to the drawings, description, and claims, all of which form the disclosure of this patent application.

BRIEF DESCRIPTION OF THE DRAWINGS

The drawings refer to some embodiments of the design provided herein in which:

FIG. 6 is an embodiment of the operations of cyber security appliance including the fingerprint module to generate a T2 fingerprint for verification of a presence of a malicious server.

Figure 1:
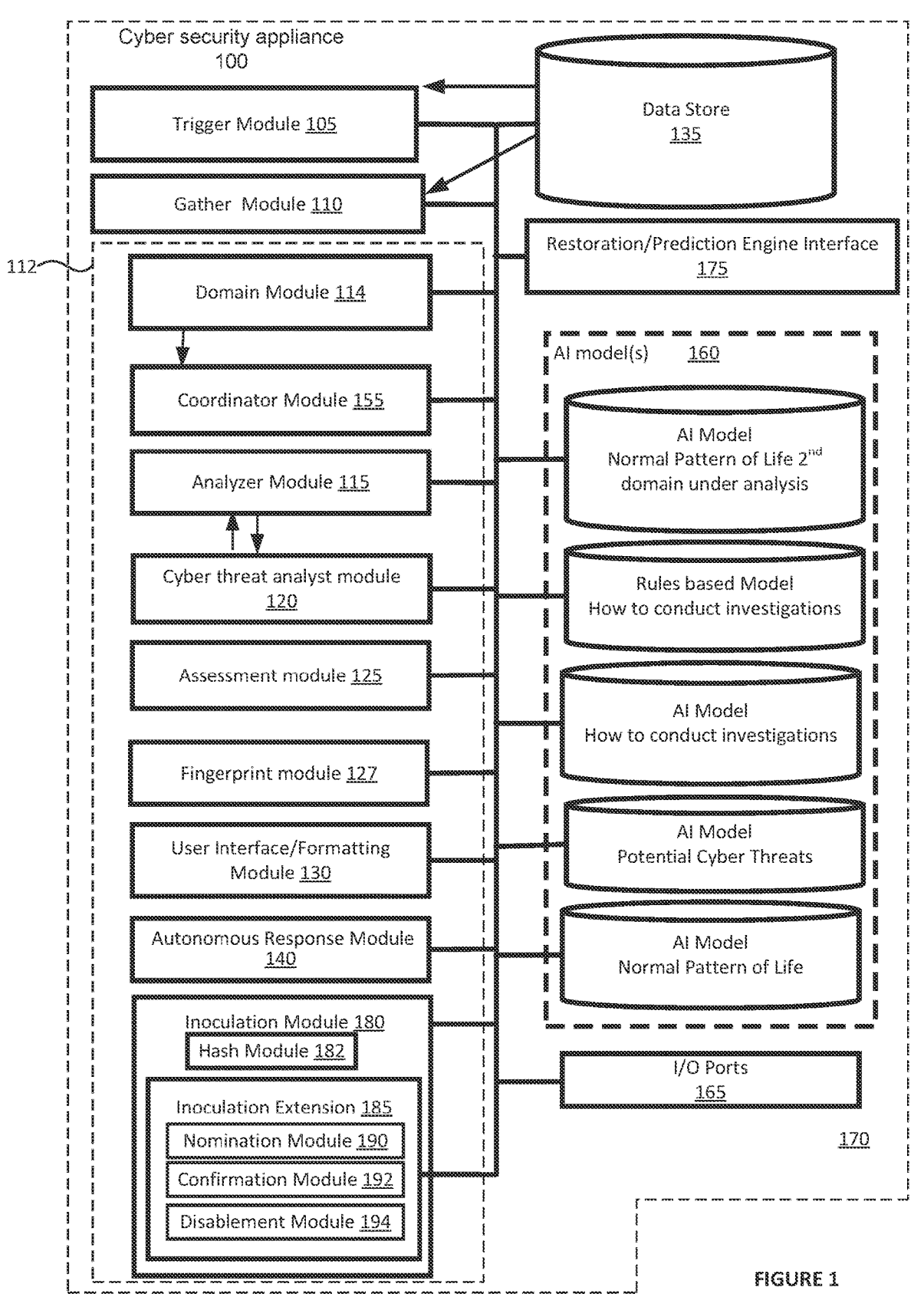
FIG. 1 illustrates an embodiment of a block diagram of an exemplary Artificial Intelligence based (AI-based) cyber security appliance.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of servers in a system, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first server, can be made. However, the specific numeric reference should not be interpreted as a literal sequential order but rather interpreted that the first server is different than a second server. Thus, the specific details set forth are merely exemplary. Also, the features implemented in one embodiment may be implemented in another embodiment where logically possible. The specific details can be varied from and still be contemplated to be within the spirit and scope of the present design.

According to one embodiment of the disclosure, a cyber security appliance features an AI-based autonomous detect component and an AI-based autonomous response component. The AI-based autonomous response component may be configured to determine whether an offensive countermeasure is a suitable response to handle a detected malicious server. One type of offensive countermeasure includes a Denial-of-Service (DoS) attack for example. The AI-based autonomous response component includes an inoculation module, which features an inoculation extension being software that assists in the coordination and handling of the offensive countermeasure. Herein, according to one embodiment of the disclosure, the inoculation extension includes (i) a nomination module, (ii) a confirmation module, and (iii) disablement module.

Herein, the nomination module is configured to operate in cooperation with the AI-based detect component to determine a risk assessment that a server in communication with a computing device within a network protected by the cyber security appliance constitutes a malicious server. This may involve analytics of behaviors of the malicious server and assignment of a risk level representing a likelihood of the server being malicious or non-malicious. If the risk level exceeds a prescribed threshold, the nomination module is configured to (i) send a message to a cyber security professional requesting authorization to launch an offensive countermeasure against the malicious server and (ii) await authorization to conduct the offensive countermeasure.

Upon receipt of the authorization, the confirmation module is in operation to signal the fingerprint module to generate a first (T1) fingerprint and a secondary (T2) fingerprint, namely a fingerprint that features a high level of uniqueness to a server associated with the T2 fingerprint. The T2 fingerprint identifies a malicious server as well as servers that are derived from or associated with the malicious server. The T2 fingerprint is provided to the confirmation module, which scans to recover IPv4 data associated with potential malicious servers for subsequent comparison with the T2 fingerprint as described below. Moreover, the T2 fingerprints may be pushed to the fleet or the wider community or used to confirm the identification of the malicious server prior to the DoS attack.

Lastly, the disablement module is configured to perform the offensive countermeasure to disable or continuously disrupt network connection availability for the malicious server such as conducting a DoS attack on the malicious server by exhausting its available sockets. Herein, the DoS attack is intended to establish and maintain active communications sessions (connections) between the cyber security appliance and the malicious server, without releasing the communication sessions. As a result, by connecting with all (or most) of the sockets, the malicious server is essentially disabled (or substantially impeded in operation) as it will not be able to fully service requests from other unsuspected targeted devices.

During the DoS attack, a maximum throughput of less than 500 kilobytes per second (kbps) is maintained. Given the low throughput, the DoS attack may be launched through an anonymity router such as the Onion router (referred to as "Tor"). Tor is free, open-source software that is configured to enable anonymous communications by concealing a user's location and usage from anyone performing network surveillance or traffic analysis.

According to one embodiment of the disclosure, the disablement module features a master component and a plurality of slave component. The master component, deployed as a software instance, is provided with network addressing information (e.g., uniform resource locators "URLs") associated one or more malicious servers. Each slave component may be a software instance configured to establish a communication session with a socket of the malicious server. Collectively, the slave components maintain the communication session through low-throughput data exchanges. The master component may be configured to distribute the URLs to a number of slave components that continue to establish communication sessions with the targeted malicious server until a connection denial is received to denote that no further communications with the malicious server are permitted. This connection denial identifies that the malicious server is overloaded, and therefore, is not operating properly. Alternatively, each URL may be distributed to a slave component which is responsible for establishing multiple connections to disable the targeted malicious server accessible via the URL. As yet another alternative embodiment, the slave components may be selected based on certain metrics such as the type of server targeted for the DoS attack, the geographical location of the targeted malicious server, operating system (OS) supported by the targeted malicious server, or the like.

General Architecture—Cyber Security Appliance

Referring to FIG. 1, a block diagram of an embodiment of the AI-based cyber security appliance 100 is illustrated. The cyber security appliance 100 is configured to protect a system, including but not limited to a network/domain, from cyber threats. Various Artificial Intelligence (AI) models and modules of the cyber security appliance 100 cooperate to protect one or more networks/domains under analysis from cyber threats. As shown, according to one embodiment of the disclosure, the AI-based cyber security appliance 100 may include a trigger module 105, a gather module 110, domain module 114, an analyzer module 115, a cyber threat analyst module 120, an assessment module 125, a fingerprint module 127, a formatting module 130, a data store 135, an autonomous response module 140, a coordinator module 155, one or more AI models 160 (hereinafter, AI model(s)"), and/or other modules. The AI model(s) 160 may be trained with machine learning on a normal pattern of life for entities in the network(s)/domain(s) under analysis, with machine learning on cyber threat hypotheses to form and investigate a cyber threat hypothesis on what are a possible set of cyber threats and their characteristics, symptoms, remediations, etc., and/or trained on possible cyber threats including their characteristics and symptoms.

The cyber security appliance 100 with the Artificial Intelligence (AI) based cyber security system may protect a network/domain from a cyber threat. In an embodiment, the cyber security appliance 100 can protect all of the devices (e.g., computing devices on the network(s)/domain(s) being monitored by monitoring domain activity including communications). For example, the domain module 114 may communicate with network sensors to monitor network traffic going to and from the computing devices on the network as well as receive secure communications from software agents embedded in host computing devices/containers. Additionally, the autonomous response module 140 may be configured to operate with an inoculation module 180, which features an inoculation extension 185 configured to perform offensive countermeasures by establishing communication sessions via I/O ports 165 to overload and effectively disable communications conducted by malicious servers. The steps below will detail the activities and functions of several of the components in the cyber security appliance 100.

The gather module 110 may be configured with one or more process identifier classifiers. Each process identifier classifier may be configured to identify and track one or more processes and/or devices in the network, under analysis, making communication connections. The data store 135 cooperates with the process identifier classifier to collect and maintain historical data of processes and their connections, which is updated over time as the network is in operation.

Individual processes may be present in merely one or more domains being monitored. In an example, the process identifier classifier can identify each process running on a given device along with its endpoint connections, which are stored in the data store 135. In addition, a feature classifier can examine and determine features in the data being analyzed into different categories. For example, the gather module 110 may be configured to obtain network addressing information (e.g., URLs, autonomous system numbers "ASNs", domain name, etc.) associated with network servers that may be determined to be potentially malicious (e.g., malicious servers).

The domain module 114 can collect, from one or more probes/sensors deployed to i) one or more network devices, ii) network taps, iii) traffic mirroring components, iv) etc. information including connection protocol requests. Information from the connection protocol requests can be transformed into, for example, 1) a source hash, 2) a hostname, and 3) an endpoint hash, such as a server hash. The source hash, such as a client JA3 hash, can be derived from the encrypted connection characteristics of the client application connecting to an endpoint outside the network, such as a proxy service and/or a web server, being protected by the cyber security appliance 100. The hostname, such as a server name, can be associated with the endpoint outside the network (e.g., www.dropbox.com). The server hash, such as a server JA3 hash, can be derived from the encrypted connection characteristics of an endpoint response from outside the network being protected by the cyber security appliance 100. Note, an "endpoint" can be a remote computing device that communicates back and forth with a device and/or application operating within a network with which it establishes a protocol connection. Examples of the endpoint may include, but are not limited or restricted to, a server (e.g., HTTP server).

Figure 8:
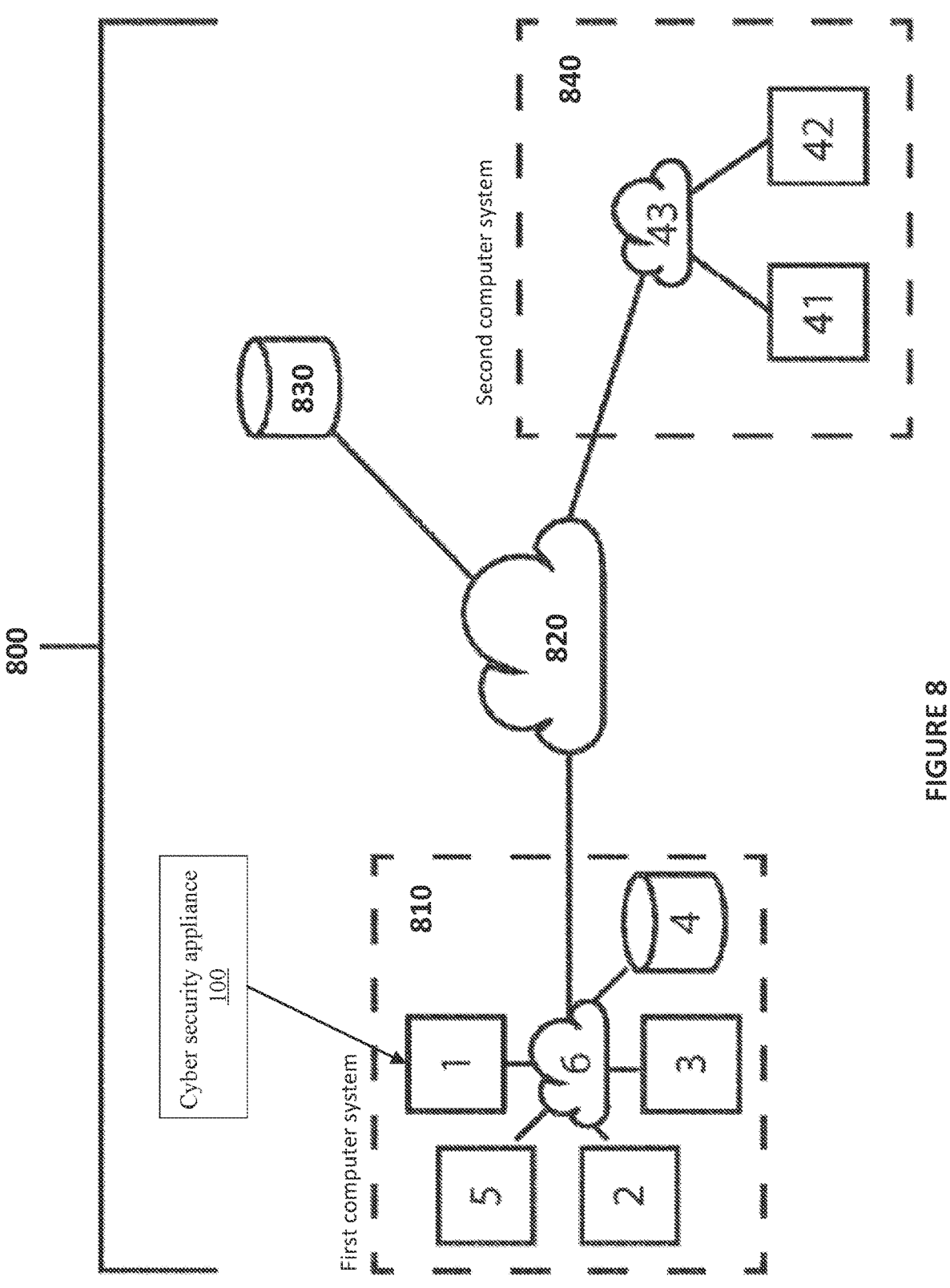
FIG. 8 illustrates an example AI-based cyber security system using a cyber threat analyst module to protect an example network.

The analyzer module 115 can cooperate with the AI model(s) 160 or other modules in the cyber security appliance 100 to confirm a presence of a cyberattack against one or more domains in an enterprise's system (e.g., see system/enterprise network 800 of FIG. 8). A process identifier in the analyzer module 115 can cooperate with the gather module 110 to collect any additional data and metrics to support a possible cyber threat hypothesis.

Similarly, the cyber threat analyst module 120 can cooperate with the internal data sources as well as external data sources to collect data in its investigation. More specifically, the cyber threat analyst module 120 can cooperate with the other modules and the AI model(s) 160 in the cyber security appliance 100 to conduct a long-term investigation and/or a more in-depth investigation of potential and emerging cyber threats directed to one or more domains in an enterprise's system. Herein, the cyber threat analyst module 120 and/or the analyzer module 115 can also monitor for other anomalies, such as model breaches, including, for example, deviations for a normal behavior of an entity, and other techniques discussed herein. As an illustrative example, the analyzer module 115 and/or the cyber threat analyst module 120 can cooperate with the AI model(s) 160 trained on potential cyber threats in order to assist in examining and factoring these additional data points that have occurred over a given timeframe to see if a correlation exists between 1) a series of two or more anomalies occurring within that time frame and 2) possible known and unknown cyber threats. The cyber threat analyst module can cooperate with the internal data sources as well as external data sources to collect data in its investigation.

According to one embodiment of the disclosure, the cyber threat analyst module 120 allows two levels of investigations of a cyber threat that may suggest a potential impending cyberattack. In a first level of investigation, the analyzer module 115 and AI model(s) 160 can rapidly detect and then the autonomous response module 140 will autonomously respond to overt and obvious cyberattacks. However, thousands to millions of low level anomalies occur in a domain under analysis all of the time; and thus, most other systems need to set the threshold of trying to detect a cyberattack by a cyber threat at level higher than the low level anomalies examined by the cyber threat analyst module 120 just to not have too many false positive indications of a cyberattack when one is not actually occurring, as well as to not overwhelm a human cyber security analyst receiving the alerts with so many notifications of low level anomalies that they just start tuning out those alerts. However, advanced persistent threats attempt to avoid detection by making these low-level anomalies in the system over time during their cyberattack before making their final coup de grâce/ultimate mortal blow against the system (e.g., domain) being protected. The cyber threat analyst module 120 also conducts a second level of investigation over time with the assistance of the AI model(s) 160 trained with machine learning on how to form cyber threat hypotheses and how to conduct investigations for a cyber threat hypothesis that can detect these advanced persistent cyber threats actively trying to avoid detection by looking at one or more of these low-level anomalies as a part of a chain of linked information.

Note, a data analysis process can be algorithms/scripts written by humans to perform their function discussed herein; and can in various cases use AI classifiers as part of their operation. The cyber threat analyst module 120 forms in conjunction with the AI model(s) 160 trained with machine learning on how to form cyber threat hypotheses and how to conduct investigations for a cyber threat hypothesis investigate hypotheses on what are a possible set of cyber threats. The cyber threat analyst module 120 can also cooperate with the analyzer module 115 to investigate on a possible set of cyber threats hypotheses that would include an anomaly of at least one of i) the abnormal behavior, ii) the suspicious activity, and iii) any combination of both, identified through cooperation with, for example, the AI model(s) 160 trained with machine learning on the normal pattern of life of entities in the system.

Figure 2:
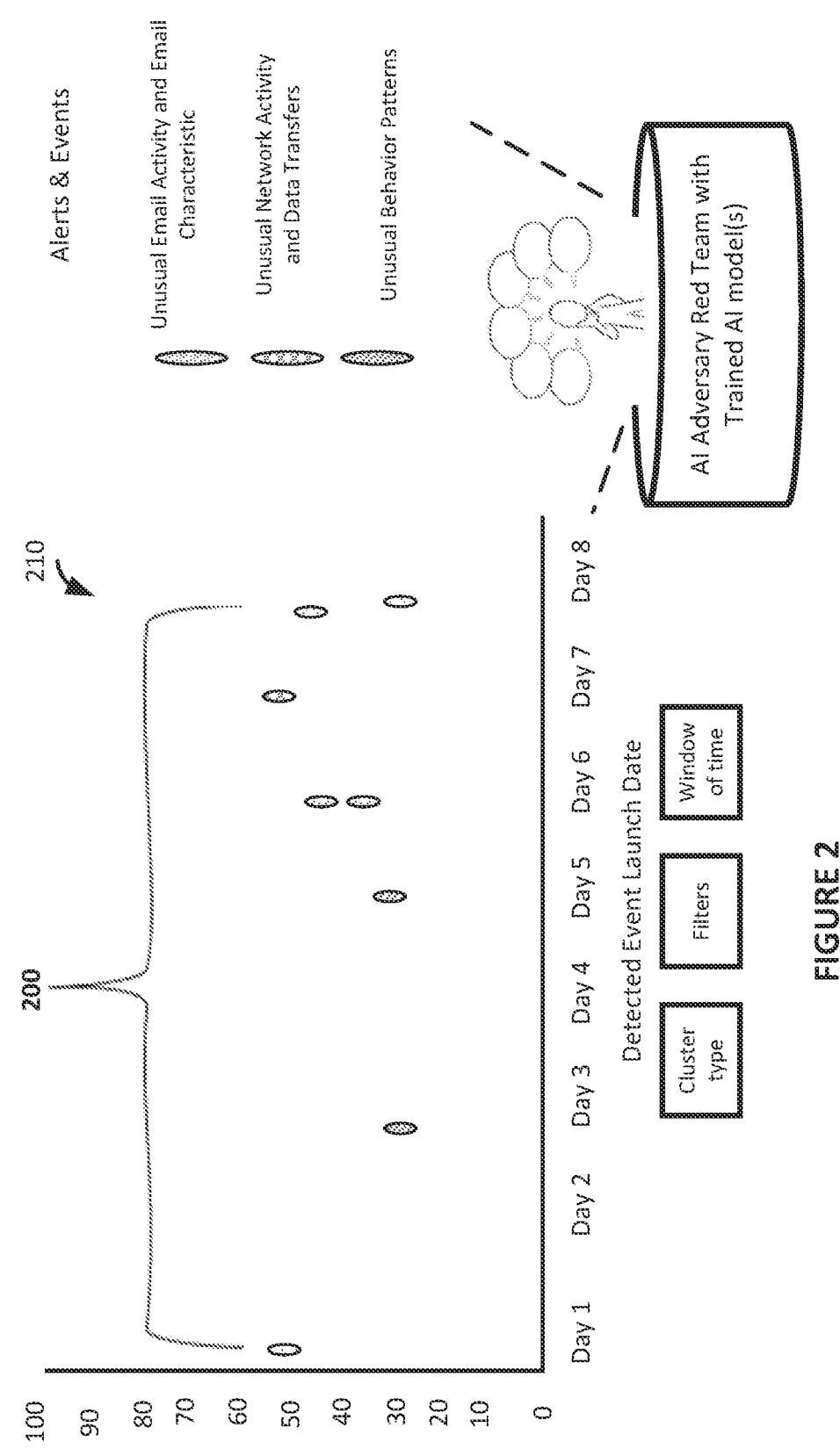
FIG. 2 illustrates a graph of an embodiment of an example chain of unusual behavior for, in this example, the email activities as well as IT activities deviating from a normal pattern of life for this user and/or device in connection with the rest of the network under analysis.

For example, as shown in FIG. 2, the cyber threat analyst module 120 may perform several additional rounds 200 of gathering additional information, including abnormal behavior, over a period of time, in this example, examining data over a 7-day period to determine causal links between the information. The cyber threat analyst module 120 may submit to check and recheck various combinations/a chain of potentially related information, including abnormal behavior of a device/user account under analysis for example, until each of the one or more hypotheses on potential cyber threats are one of 1) refuted, 2) supported, or 3) included in a report that includes details of activities assessed to be relevant activities to the anomaly of interest to the user and that also conveys at least this particular hypothesis was neither supported or refuted. For this embodiment, a human cyber security analyst is needed to further investigate the anomaly (and/or anomalies) of interest included in the chain of potentially related information.

Returning back to FIG. 1, an input from the cyber threat analyst module 120 of a supported hypothesis of a potential cyber threat will trigger the analyzer module 115 to compare, confirm, and send a signal to act upon and mitigate that cyber threat. In contrast, the cyber threat analyst module 120 investigates subtle indicators and/or initially seemingly isolated unusual or suspicious activity such as a worker is logging in after their normal working hours or a simple system misconfiguration has occurred. Most of the investigations conducted by the cyber threat analyst module 120 cooperating with the AI model(s) 160 trained with machine learning on how to form cyber threat hypotheses and how to conduct investigations for a cyber threat hypothesis on unusual or suspicious activities/behavior may not result in a cyber threat hypothesis that is supported but rather most are refuted or simply not supported. Typically, during the investigations, several rounds of data gathering to support or refute the extensive list of potential cyber threat hypotheses formed by the cyber threat analyst module 120 will occur before the algorithms in the cyber threat analyst module 120 will determine whether a particular cyber threat hypothesis is supported, refuted, or needs further investigation by a human. The rounds of data gathering may build chains of linked low-level indicators of unusual activity along with potential activities that could be within a normal pattern of life for that entity to evaluate the whole chain of activities to support or refute each potential cyber threat hypothesis formed. (See again, for example, FIG. 2 and a chain of linked low-level indicators, including abnormal behavior compared to the normal patten of life for that entity, all under a score of 50 on a threat indicator score). The investigations by the cyber threat analyst module 120 can happen over a relatively long period of time and be far more in depth than the analyzer module 115 which will work with the other modules and AI model(s) 160 to confirm that a cyber threat has in fact been detected.

The gather module 110 may further extract data from the data store 135 at the request of the cyber threat analyst module 120 and/or analyzer module 115 on each possible hypothetical threat that would include the abnormal behavior or suspicious activity and then can assist to filter that collection of data down to relevant points of data to either 1) support or 2) refute each particular hypothesis of what the cyber threat, the suspicious activity and/or abnormal behavior relates to. The gather module 110 cooperates with the cyber threat analyst module 120 and/or analyzer module 115 to collect data to support or to refute each of the one or more possible cyber threat hypotheses that could include this abnormal behavior or suspicious activity by cooperating with one or more of the cyber threat hypotheses mechanisms to form and investigate hypotheses on what are a possible set of cyber threats.

Thus, the cyber threat analyst module 120 is configured to cooperate with the AI model(s) 160 trained with machine learning on how to form cyber threat hypotheses and how to conduct investigations for a cyber threat hypothesis to form and investigate hypotheses on what are a possible set of cyber threats and then can cooperate with the analyzer module 115 with the one or more data analysis processes to confirm the results of the investigation on the possible set of cyber threats hypotheses that would include the at least one of i) the abnormal behavior, ii) the suspicious activity, and iii) any combination of both, identified through cooperation with the AI model(s) 160 trained with machine learning on the normal pattern of life/normal behavior of entities in the domains under analysis.

Note, in the first level of threat detection, the gather module 110 and the analyzer module 115 cooperate to supply any data and/or metrics requested by the analyzer module 115 cooperating with the AI model(s) 160 trained on possible cyber threats to support or rebut each possible type of cyber threat. Again, the analyzer module 115 can cooperate with the AI model(s) 160 and/or other modules to rapidly detect and then cooperate with the autonomous response module 140 to autonomously respond to overt and obvious cyberattacks, (including ones found to be supported by the cyber threat analyst module 120).

As a starting point, the AI-based cyber security appliance 100 can use multiple modules, each capable of identifying abnormal behavior and/or suspicious activity against the AI model(s) 160 of normal behavior for the entities in the network/domain under analysis, which is supplied to the analyzer module 115 and/or the cyber threat analyst module 120. The analyzer module 115 and/or the cyber threat analyst module 120 may also receive other inputs such as AI model breaches, AI classifier breaches, etc. a trigger to start an investigation from an external source.

Many other model breaches of the AI model(s) 160 trained with machine learning on the normal behavior of the system can send an input into the cyber threat analyst module 120 and/or the trigger module 105 to trigger an investigation to start the formation of one or more hypotheses on what are a possible set of cyber threats that could include the initially identified abnormal behavior and/or suspicious activity. Note, a deeper analysis can look at example factors such as i) how long has the endpoint existed or is registered; ii) what kind of certificate is the communication using; iii) is the endpoint on a known good domain or known bad domain or an unknown domain, and if unknown what other information exists such as registrant's name and/or country; iv) how rare; v), etc.

Note, the cyber threat analyst module 120 cooperating with the AI model(s) 160 trained with machine learning on how to form cyber threat hypotheses and how to conduct investigations for a cyber threat hypothesis in the AI-based cyber security appliance 100 provides an advantage as it reduces the time taken for human led or cyber security investigations, provides an alternative to manpower for small organizations and improves detection (and remediation) capabilities within the cyber security appliance 100.

The cyber threat analyst module 120, which forms and investigates hypotheses on what are the possible set of cyber threats, can use hypotheses mechanisms including any of 1) one or more of the AI model(s) 160 trained on how human cyber security analysts form cyber threat hypotheses and how to conduct investigations for a cyber threat hypothesis that would include at least an anomaly of interest, 2) one or more scripts outlining how to conduct an investigation on a possible set of cyber threats hypotheses that would include at least the anomaly of interest, 3) one or more rules-based models on how to conduct an investigation on a possible set of cyber threats hypotheses and how to form a possible set of cyber threats hypotheses that would include at least the anomaly of interest, and 4) any combination thereof. Again, the AI model(s) 160 trained on 'how to form cyber threat hypotheses and how to conduct investigations for a cyber threat hypothesis' may use supervised machine learning on human-led cyber threat investigations and then steps, data, metrics, and metadata on how to support or to refute a plurality of the possible cyber threat hypotheses, and then the scripts and rules-based models will include the steps, data, metrics, and metadata on how to support or to refute the plurality of the possible cyber threat hypotheses. The cyber threat analyst module 120 and/or the analyzer module 115 can feed the cyber threat details to the assessment module 125 to generate a threat risk score that indicate a level of severity of the cyber threat.

According to one embodiment of the disclosure, the assessment module 125 can cooperate with the AI model(s) 160 trained on possible cyber threats to use AI algorithms to identify actual cyber threats and generate threat risk scores based on both the level of confidence that the cyber threat is a viable threat and the severity of the cyber threat (e.g., attack type where ransomware attacks has greater severity than phishing attack; degree of infection; computing devices likely to be targeted, etc.). The threat risk scores be used to rank alerts that may be directed to enterprise or computing device administrators. This risk assessment and ranking is conducted to avoid frequent "false positive" alerts that diminish the degree of reliance/confidence on the cyber security appliance 100.

The fingerprint module 127 is configured to receive server information associated with potential malicious servers, such as hostname for example, from the analyzer module 115 and/or cyber threat analyst module 120. From the server information, the fingerprint module 127 is configured to 1) create an unencrypted target fingerprint based on intransient (constant) characteristics (e.g. consistent connection header information, server characteristics, etc.) of the known malicious web server gleaned from sending a series of unencrypted connection protocol requests, 2) create an encrypted fingerprint for the known malicious web server based on sending a series of encrypted secure connection protocol requests, and 3) to build a server (T1) fingerprint for the malicious web server from characteristics associated with the encrypted target fingerprint and/or the unencrypted target fingerprint as described below.

Referring still to FIG. 1, the autonomous response module 140 is configured to take one or more autonomous mitigation actions to mitigate the cyber threat during the cyberattack by the cyber threat. The autonomous response module 140 can reference an AI model trained to track a normal pattern of life for each node of the protected system to perform an autonomous act of, for example, restricting a potentially compromised node having i) an actual indication of compromise and/or ii) merely adjacent to a known compromised node, to merely take actions that are within that node's normal pattern of life to mitigate the cyber threat.

The chain of the individual alerts, activities, and events that form the pattern including one or more unusual or suspicious activities into a distinct item for cyber-threat analysis of that chain of distinct alerts, activities, and/or events. The cyber threat analyst module 120 may reference the one or more machine learning models trained on, in this example, e-mail threats to identify similar characteristics from the individual alerts and/or events forming the distinct item made up of the chain of alerts and/or events forming the unusual pattern. In the next step, the assessment module 125 with the AI classifiers, once armed with the knowledge that malicious activity is likely occurring/is associated with a given process from the analyzer module 115, then cooperates with the autonomous response module 140 to take an autonomous action such as i) deny access in or out of the device or the network ii) shutdown activities involving a detected malicious agent, iii) restrict devices and/or user's to merely operate within their particular normal pattern of life, iv) remove some user privileges/permissions associated with the compromised user account, and/or v) conduct offensive countermeasures to disable operations of a malicious server responsible for the malicious activity, such as a cyber threat or an on-going cyberattack.

The autonomous response module 140, rather than a human taking an action, can be configured to cause one or more rapid autonomous actions in response to be taken to counter the cyber threat, which may include disabling a source of the cyber threat (e.g., malicious server(s)). The disabling of the malicious server may be accomplished by disabling its ability to communicate with targeted systems.

As further shown in FIG. 1, the autonomous response module 140 may be configured to operate with the inoculation module 180. The inoculation module 180 can deploy active measures to identify a potentially malicious endpoint (e.g., malicious server). The inoculation module 180 may be configured with a hash module 182, which may be used to generate a server fingerprint based on information associated with request/response to establish a communication session (e.g., encrypted connection such as a secure socket layer "SSL" connection). A dataset of known client hashes (e.g., TLS fingerprinting with JA3), known server hashes, hostnames, and the like may be maintained and used with a machine learning approach for fleetwide alerts to cyber security appliances, as described below.

The inoculation module 180 further includes one or more software modules (referred to as "inoculation extension 185"). The inoculation extension 185 includes (i) a nomination module 190, (ii) a confirmation module 192, and (iii) a disablement module 194. The inoculation extension 185 is configured to receive information associated with endpoints determined to be malicious endpoints (e.g., malicious server, etc.) and provide portions of malicious server information as part of an authorization request message from the nomination module 190 and a disablement request message from the disablement module 194.

According to one embodiment of the disclosure, the nomination module 190 is configured to operate in cooperation with the AI-based detect component (e.g., analyzer module 115 and/or cyber threat analyst module 120) that determines a risk of a server, which is in communication with a computing device within a network protected by the cyber security appliance 100, constitutes a malicious server. This risk assessment may involve analytics of behaviors of the server (and assignment of a risk level associated with the server) conducted by the AI-based autonomous detect component 112. If the server is classified as a malicious server, the nomination module 190 is configured to (i) send a message to a cyber security professional requesting authorization to launch an offensive countermeasure against the malicious server and (ii) await authorization to conduct the offensive countermeasure.

Upon receipt of the authorization, the confirmation module 192 utilizes the fingerprint module 127 to perform operations to generate a secondary (T2) fingerprint directed to the malicious server. The T2 fingerprint features a high level of uniqueness to a server than the T1 fingerprint. The content of the T2 fingerprint is used to identify the potential malicious server as well as other related servers. The T2 fingerprints may be compared with T1 fingerprints of potential malicious servers to verify the malicious server. The T2 fingerprints may be pushed to the fleet (one or more other cyber security appliances) or the wider community or used to confirm the identification of the malicious server prior to initiating the offensive countermeasure.

The disablement module 194 is configured to perform the offensive countermeasure to disable the malicious server such as conducting a Denial of Service (DoS) attack on the malicious server in efforts to exhaust its available sockets. Herein, the disablement module 194 is configured to establish and maintain active communications sessions (connections) between the cyber security appliance 100 and the malicious server, without any intent on releasing the communication sessions. As a result, by connecting with most or all of the sockets of the malicious server, the cyber security appliance 100 is essentially disabling the malicious server as it will not be able to service requests from other unsuspected targeted devices.

During the DoS attack, a maximum throughput of less than 500 kilobytes per second (kbps) is maintained. Given the low throughput, the DoS attack may be launched through an anonymity router module such as open-source routing software like the Onion router (referred to as "Tor"). Tor enables anonymous communications by concealing a user's location and usage.

According to one embodiment of the disclosure, the disablement module 194 features a master component (e.g., software instance) 195 and a plurality of slave components (e.g., software instances) 196. The master component 195 is provided network addressing information (e.g., URLs) associated one or more malicious servers. Herein, the URLs may be provided from an AI-based autonomous detect component 112 such as the domain module 114, analyzer module 115, cyber threat analyst module 120, and/or the assessment module 125. Each slave component 196 may be a software instance configured to establish a communication session with a socket of the malicious server. Collectively, the slave components 196 maintain the communication session through low-throughput data exchanges.

The master component 195 may be configured to distribute the URLs to at least some of the slave components 196 for use in establishing communication sessions with a malicious server until a connection denial (error) is received to denote that no further communications with the malicious server are permitted. This connection denial identifies that the malicious server is overloaded, and therefore, is not operating properly. Alternatively, each URL may be distributed to a particular slave component that is responsible for initiating and maintaining multiple communication sessions with the malicious server accessed by the URL. Also, the URLs may be distributed to different slave components 196 based on server type (e.g., certain slave components are configured to handle certain server types), geography, or the like.

Herein, the autonomous response module 140 further includes a user interface to program the module 140 i) to merely make a suggested response to take to counter the cyber threat that will be presented on a display screen and/or sent by a notice to an enterprise security administrator professional for explicit authorization when the cyber threat is detected or ii) to autonomously take a response to counter the cyber threat without a need for a human to approve the response when the cyber threat is detected. The autonomous response module 140 will then send a notice of the autonomous response as well as display the autonomous response taken on the display screen. Example autonomous responses may include cut off connections, shutdown devices, change the privileges of users, delete, and remove malicious links in emails, slow down a transfer rate, cooperate with other security devices such as a firewall to trigger its autonomous actions, conduct an offensive attack on a targeted malicious server, and other autonomous actions against the devices and/or users. The autonomous response module 140 uses one or more of the AI model(s) 160 that are configured to intelligently work with other third-party defense systems in that customer's network against threats. The autonomous response module 140 can send its own protocol commands to devices and/or take actions on its own.

In addition, the autonomous response module 140 uses the one or more of the AI model(s) 160 to orchestrate with other third-party defense systems to create a unified defense response against a detected threat within or external to that customer's network. The autonomous response module 140 can be an autonomous self-learning digital response coordinator that is trained specifically to control and reconfigure the actions of traditional legacy computer defenses (e.g., firewalls, switches, proxy servers, etc.) to contain threats propagated by, or enabled by, networks and the internet. The cyber threat analyst module 120 and/or assessment module 125 can cooperate with the autonomous response module 140 to cause one or more autonomous actions in response to be taken to counter the cyber threat, including conducting an offensive countermeasure and/or imposing operational restrains by the targeted computing device by limiting an impact of the cyber threat from consuming unauthorized CPU cycles, memory space, and power consumption in the computing devices causes by responding to the cyber threat. Training of AI Pre-deployment/Deployment In step 1, an initial training of the AI model trained on cyber threats can occur using unsupervised learning and/or supervised learning on characteristics and attributes of known potential cyber threats including malware, insider threats, and other kinds of cyber threats that can occur within that domain. Each Artificial Intelligence can be programmed and configured with the background information to understand and handle particulars, including different types of data, protocols used, types of devices, user accounts, etc. of the system being protected. The Artificial Intelligence pre-deployment can all be trained on the specific machine learning task that they will perform when put into deployment. For example, the AI model, such as AI model(s) 160 or example (hereinafter "AI model(s) 160"), trained on identifying a specific cyber threat learns at least both in the pre-deployment training i) the characteristics and attributes of known potential cyber threats as well as ii) a set of characteristics and attributes of each category of potential cyber threats and their weights assigned on how indicative certain characteristics and attributes correlate to potential cyber threats of that category of threats.

In this example, one of the AI model(s) 160 trained on identifying a specific cyber threat can be trained with machine learning such as Linear Regression, Regression Trees, Non-Linear Regression, Bayesian Linear Regression, Deep learning, etc. to learn and understand the characteristics and attributes in that category of cyber threats. Later, when in deployment in a domain/network being protected by the cyber security appliance 100, the AI model trained on cyber threats can determine whether a potentially unknown threat has been detected via a number of techniques including an overlap of some of the same characteristics and attributes in that category of cyber threats. The AI model may use unsupervised learning when deployed to better learn newer and updated characteristics of cyberattacks.

In an embodiment, one or more of the AI models 160 may be trained on a normal behavior of entities in the system are self-learning AI model using unsupervised machine learning and machine learning algorithms to analyze patterns and 'learn' what is the 'normal behavior' of the network by analyzing data on the activity on, for example, the network level, at the device level, and at the employee level. The self-learning AI model using unsupervised machine learning understands the system under analysis' normal patterns of life in, for example, a week of being deployed on that system, and grows more bespoke with every passing minute. The AI unsupervised learning model learns patterns from the features in the day-to-day dataset and detecting abnormal data which would not have fallen into the category (cluster) of normal behavior. The self-learning AI model using unsupervised machine learning can simply be placed into an observation mode for an initial week or two when first deployed on a network/domain in order to establish an initial normal behavior for entities in the network/domain under analysis.

A deployed AI model trained on a normal behavior of entities in the system can be configured to observe the nodes in the system being protected. Training on a normal behavior of entities in the system can occur while monitoring for the first week or two until enough data has been observed to establish a statistically reliable set of normal operations for each node (e.g., user account, device, etc.). Initial training of one or more of the AI model(s) 160 trained with machine learning on a behavior of the pattern of life of the entities in the network/domain can occur where each type of network and/or domain will generally have some common typical behavior with each model trained specifically to understand components/devices, protocols, activity level, etc. to that type of network/system/domain. Alternatively, pre-deployment machine learning training of the AI model(s) 160 trained on a normal behavior of entities in the system can occur. What is normal behavior of each entity within that system can be established either prior to deployment and then adjusted during deployment or alternatively the model can simply be placed into an observation mode for an initial week or two when first deployed on a network/domain in order to establish an initial normal behavior for entities in the network/domain under analysis.

During deployment, what is considered normal behavior will change as each different entity's behavior changes and will be reflected through the use of unsupervised learning in the model such as various Bayesian techniques, clustering, etc. The AI model(s) 160 can be implemented with various mechanisms such as neural networks, decision trees, etc. and combinations of these. Likewise, one or more supervised machine learning AI model(s) 160 may be trained to create possible hypotheses and perform cyber threat investigations on agnostic examples of past historical incidents of detecting a multitude of possible types of cyber threat hypotheses previously analyzed by human cyber security analyst. More on the training of AI model(s) 160 are trained to create one or more possible hypotheses and perform cyber threat investigations will be discussed later.

At its core, the self-learning AI models 160 that model the normal behavior (e.g. a normal pattern of life) of entities in the network mathematically characterizes what constitutes 'normal' behavior, based on the analysis of a large number of different measures of a device's network behavior-packet traffic and network activity/processes including server access, data volumes, timings of events, credential use, connection type, volume, and directionality of, for example, uploads/downloads into the network, file type, packet intention, admin activity, resource and information requests, command sent, etc.

In order to model what should be considered as normal for a device or cloud container, its behavior can be analyzed in the context of other similar entities on the network. The AI models (e.g., AI model(s) 160) can use unsupervised machine learning to algorithmically identify significant groupings, a task which is virtually impossible to do manually. To create a holistic image of the relationships within the network, the AI models and AI classifiers employ a number of different clustering methods, including matrix-based clustering, density-based clustering, and hierarchical clustering techniques. The resulting clusters can then be used, for example, to inform the modeling of the normative behaviors and/or similar groupings.

The AI models and AI classifiers can employ a large-scale computational approach to understand sparse structure in models of network connectivity based on applying L1-regularization techniques (the lasso method). This allows the artificial intelligence to discover true associations between different elements of a network which can be cast as efficiently solvable convex optimization problems and yield parsimonious models. Various mathematical approaches assist.

Next, one or more supervised machine learning AI models are trained to create possible hypotheses and how to perform cyber threat investigations on agnostic examples of past historical incidents of detecting a multitude of possible types of cyber threat hypotheses previously analyzed by human cyber security analyst. AI models trained on forming and investigating hypotheses on what are a possible set of cyber threats can be trained initially with supervised learning. Thus, these AI models can be trained on how to form and investigate hypotheses on what are a possible set of cyber threats and steps to take in supporting or refuting hypotheses. The AI models trained on forming and investigating hypotheses are updated with unsupervised machine learning algorithms when correctly supporting or refuting the hypotheses including what additional collected data proved to be the most useful.

Next, the various AI models and AI classifiers combine use of unsupervised and supervised machine learning to learn 'on the job'—it does not depend upon solely knowledge of previous cyberattacks. The AI models and classifiers combine use of unsupervised and supervised machine learning constantly revises assumptions about behavior, using probabilistic mathematics, which is always up to date on what a current normal behavior is, and not solely reliant on human input. The AI models and classifiers combine use of unsupervised and supervised machine learning on cyber security is capable of seeing hitherto undiscovered cyber events, from a variety of threat sources, which would otherwise have gone unnoticed.

Next, these cyber threats can include, for example, Insider threat-malicious or accidental, Zero-day attacks-previously unseen, novel exploits, latent vulnerabilities, machine-speed attacks-ransomware and other automated attacks that propagate and/or mutate very quickly, Cloud and SaaS-based attacks, other silent and stealthy attacks advance persistent threats, advanced spear-phishing, etc.

Referring still to FIG. 1, the assessment module 125 and/or cyber threat analyst module 120 can cooperate with the AI model(s) 160 trained on possible cyber threats to use AI algorithms to account for ambiguities by distinguishing between the subtly differing levels of evidence that characterize network data. Instead of generating the simple binary outputs 'malicious' or 'benign,' the AI's mathematical algorithms produce outputs marked with differing degrees of potential threat. This enables users of the system to rank alerts or notifications to the enterprise security administrator in a rigorous manner and prioritize those which most urgently require action. Meanwhile, it also assists to avoid the problem of numerous false positives associated with simply a rule-based approach.

As discussed in more detail above, the analyzer module 115 and/or cyber threat analyst module 120 can cooperate with the one or more unsupervised AI (machine learning) model 160 trained on the normal pattern of life/normal behavior in order to perform anomaly detection against the actual normal pattern of life for that system to determine whether an anomaly (e.g., the identified abnormal behavior and/or suspicious activity) is malicious or benign. In the operation of the cyber security appliance 100, the emerging cyber threat can be previously unknown, but the emerging threat landscape data representative of the emerging cyber threat shares enough (or does not share enough) in common with the traits from the AI models 160 trained on cyber threats to now be identified as malicious or benign. Note, if later confirmed as malicious, then the AI models 160 trained with machine learning on possible cyber threats can update their training. Likewise, as the cyber security appliance 100 continues to operate, then the one or more AI models trained on a normal pattern of life for each of the entities in the system can be updated and trained with unsupervised machine learning algorithms. The analyzer module 115 can use any number of data analysis processes (discussed more in detail below and including the agent analyzer data analysis process here) to help obtain system data points so that this data can be fed and compared to the one or more AI models trained on a normal pattern of life, as well as the one or more machine learning models trained on potential cyber threats, as well as create and store data points with the connection fingerprints.

The AI model(s) 160 can continually learn and train with unsupervised machine learning algorithms on an ongoing basis when deployed in their system that the cyber security appliance 100 is protecting. Thus, learning and training on what is normal behavior for each user, each device, and the system overall and lowering a threshold of what is an anomaly.

Anomaly Detection/Deviations

Anomaly detection can discover unusual data points in your dataset. Anomaly can be a synonym for the word 'outlier.' Anomaly detection (or outlier detection) is the identification of rare (e.g., substantially infrequent) items, events or observations which raise suspicions by differing significantly from the majority of the data. Anomalous activities can be linked to some kind of problems or rare events. Since there are tons of ways to induce a particular cyberattack, it is difficult to have information about all these attacks beforehand in a dataset. But, since the majority of the user activity and device activity in the system under analysis is normal, the system overtime captures almost all of the ways which indicate normal behavior. And from the inclusion-exclusion principle, if an activity under scrutiny does not give indications of normal activity, the self-learning AI model using unsupervised machine learning can predict with high confidence that the given activity is anomalous. The AI unsupervised learning model learns patterns from the features in the day-to-day dataset and detecting abnormal data which would not have fallen into the category (cluster) of normal behavior. The goal of the anomaly detection algorithm through the data fed to it is to learn the patterns of a normal activity so that when an anomalous activity occurs, the modules can flag the anomalies through the inclusion-exclusion principle. The goal of the anomaly detection algorithm through the data fed to it is to learn the patterns of a normal activity so that when an anomalous activity occurs, the modules can flag the anomalies through the inclusion-exclusion principle. The cyber threat module can perform its two-level analysis on anomalous behavior and determine correlations.

In an example, 95% of data in a normal distribution lies within two standard-deviations from the mean. Since the likelihood of anomalies in general is very low, the modules cooperating with the AI model of normal behavior can say with high confidence that data points spread near the mean value are non-anomalous. And since the probability distribution values between mean and two standard-deviations are large enough, the modules cooperating with the AI model of normal behavior can set a value in this example range as a threshold (a parameter that can be tuned over time through the self-learning), where feature values with probability larger than this threshold indicate that the given feature's values are non-anomalous, otherwise it's anomalous. Note, this anomaly detection can determine that a data point is anomalous/non-anomalous on the basis of a particular feature. In reality, the cyber security appliance 100 should not flag a data point as an anomaly based on a single feature. Merely, when a combination of all the probability values for all features for a given data point is calculated can the modules cooperating with the AI model of normal behavior can say with high confidence whether a data point is an anomaly or not.

Again, the AI models trained on a normal behavior of entities in a system (e.g., domain) under analysis may perform the cyber threat detection through a probabilistic change in a normal behavior through the application of, for example, an unsupervised Bayesian mathematical model to detect the behavioral change in computers and computer networks. The Bayesian probabilistic approach can determine periodicity in multiple time series data and identify changes across single and multiple time series data for the purpose of anomalous behavior detection. Please reference U.S. Pat. No. 10,701,093 granted Jun. 30, 2020, titled "Anomaly alert system for cyber threat detection" for an example Bayesian probabilistic approach, which is incorporated by reference in its entirety. In addition, please reference US patent publication number "US2021273958A1 filed Feb. 26, 2021, titled "Multi-stage anomaly detection for process chains in multi-host environments" for another example anomalous behavior detector using a recurrent neural network and a bidirectional long short-term memory (LSTM), which is incorporated by reference in its entirety. In addition, please reference US patent publication number "US2020244673A1, filed Apr. 23, 2019, titled "Multivariate network structure anomaly detector," which is incorporated by reference in its entirety, for another example anomalous behavior detector with a Multivariate Network and Artificial Intelligence classifiers.

Next, as discussed further below, during pre-deployment the cyber threat analyst module 120 and the analyzer module 115 can use data analysis processes and cooperate with AI model(s) 160 trained on forming and investigating hypotheses on what are a possible set of cyber threats. In addition, another set of AI models can be trained on how to form and investigate hypotheses on what are a possible set of cyber threats and steps to take in supporting or refuting hypotheses. The AI models trained on forming and investigating hypotheses are updated with unsupervised machine learning algorithms when correctly supporting or refuting the hypotheses including what additional collected data proved to be the most useful.

Similarly, during deployment, the data analysis processes (discussed herein) used by the analyzer module 115 can use unsupervised machine learning to update the initial training learned during pre-deployment, and then update the training with unsupervised learning algorithms during the cyber security appliance's 100 deployment in the system being protected when various different steps to either i) support or ii) refute the possible set of cyber threats hypotheses worked better or worked worse.

The AI model(s) 160 trained on a normal behavior of entities in a domain under analysis may perform the threat detection through a probabilistic change in a normal behavior through the application of, for example, an unsupervised Bayesian mathematical model to detect a behavioral change in computers and computer networks. The Bayesian probabilistic approach can determine periodicity in multiple time series data and identify changes across single and multiple time series data for the purpose of anomalous behavior detection. In an example, a system being protected can include both email and IT network domains under analysis. Thus, email and IT network raw sources of data can be examined along with a large number of derived metrics that each produce time series data for the given metric.

Additional Module Interactions

Referring back to FIG. 1, the gather module 110 cooperates with the data store 135. The data store 135 stores comprehensive logs for network traffic observed. These logs can be filtered with complex logical queries and each IP packet can be interrogated on a vast number of metrics in the network information stored in the data store. Similarly, other domain's communications and data, such as emails, logs, etc. may be collected and stored in the data store 135. The gather module 110 may consist of multiple automatic data gatherers that each look at different aspects of the data depending on the particular hypothesis formed for the analysed event. The data relevant to each type of possible hypothesis can be automatically pulled from additional external and internal sources. Some data is retrieved by the gather module 110 for each possible hypothesis.

The data store 135 can store the metrics and previous threat alerts associated with network traffic for a period of time, which is, by default, at least 27 days. This corpus of data is fully searchable. The cyber security appliance 100 works with network probes to monitor network traffic and store and record the data and metadata associated with the network traffic in the data store.

The gather module 110 may have a process identifier classifier. The process identifier classifier can identify and track each process and device in the network, under analysis, making communication connections. The data store 135 cooperates with the process identifier classifier to collect and maintain historical data of processes and their connections, which is updated over time as the network is in operation. In an example, the process identifier classifier can identify each process running on a given device along with its endpoint connections, which are stored in the data store. Similarly, data from any of the domains under analysis may be collected and compared.

Examples of domains/networks under analysis being protected can include any of i) an Informational Technology network, ii) an Operational Technology network, iii) a Cloud service, iv) a SaaS service, v) an endpoint device, vi) an email domain, and vii) any combinations of these. The domain module 114 is constructed and coded to interact with and understand a specific domain.

For instance, the domain module 114 may operate as an IT network module configured to receive information from and send information to, in this example, IT network-based sensors (i.e., probes, taps, etc.). The domain module 114 also has algorithms and components configured to understand, in this example, IT network parameters, IT network protocols, IT network activity, and other IT network characteristics of the network under analysis. The domain module 114 may be further configured, in this example, with an email module. The domain module 114 may include an email network module configured to receive information from and send information to, in this example, email-based sensors (i.e., probes, taps, etc.). The domain module 114 also has algorithms and components configured to understand, in this example, email parameters, email protocols and formats, email activity, and other email characteristics of the network under analysis. Additional domain modules can also collect domain data from another respective domain.

The coordinator module 155 is configured to work with various machine learning algorithms and relational mechanisms to i) assess, ii) annotate, and/or iii) position in a vector diagram, a directed graph, a relational database, etc., activity including events occurring, for example, in the first domain compared to activity including events occurring in the second domain. The domain modules can cooperate to exchange and store their information with the data store.

The process identifier classifier (not shown) in the gather module 110 can cooperate with additional classifiers in the domain modules 114 to assist in tracking individual processes and associating them with entities in a domain under analysis as well as individual processes and how they relate to each other. The process identifier classifier can cooperate with other trained AI classifiers in the modules to supply useful metadata along with helping to make logical nexuses.

A feedback loop of cooperation exists between the gather module 110, the analyzer module 115, AI model(s) 160 trained on different aspects of this process, and the cyber threat analyst module 120 to gather information to determine whether a cyber threat is potentially attacking the networks/ domains under analysis.

Illustrative Malicious Determination Process

In the following examples the analyzer module 115 and/or cyber threat analyst module 120 can use multiple factors to the determination of whether a process, event, object, entity, etc. is likely malicious.

In an example, the analyzer module 115 and/or cyber threat analyst module 120 can cooperate with one or more of the AI model(s) 160 trained on certain cyber threats to detect whether the anomalous activity detected, such as suspicious email messages, exhibit traits that may suggest a malicious intent, such as phishing links, scam language, sent from suspicious domains, etc. The analyzer module 115 and/or cyber threat analyst module 120 can also cooperate with one of more of the AI model(s) 160 trained on potential IT based cyber threats to detect whether the anomalous activity detected, such as suspicious IT links, URLs, domains, user activity, etc., may suggest a malicious intent as indicated by the AI models trained on potential IT based cyber threats.

In the above example, the analyzer module 115 and/or the cyber threat analyst module 120 can cooperate with the one or more AI models 160 trained with machine learning on the normal pattern of life for entities in an email domain under analysis to detect, in this example, anomalous emails which are detected as outside of the usual pattern of life for each entity, such as a user, email server, etc., of the email network/domain. Likewise, the analyzer module 115 and/or the cyber threat analyst module 120 can cooperate with the one or more AI models trained with machine learning on the normal pattern of life for entities in a second domain under analysis (in this example, an IT network) to detect, in this example, anomalous network activity by user and/or devices in the network, which is detected as outside of the usual pattern of life (e.g. abnormal) for each entity, such as a user or a device, of the second domain's network under analysis.

Thus, the analyzer module 115 and/or the cyber threat analyst module 120 can be configured with one or more data analysis processes to cooperate with the one or more of the AI model(s) 160 trained with machine learning on the normal pattern of life in the system, to identify an anomaly of at least one of i) the abnormal behavior, ii) the suspicious activity, and iii) the combination of both, from one or more entities in the system. Note, other sources, such as other model breaches, can also identify at least one of i) the abnormal behavior, ii) the suspicious activity, and iii) the combination of both to trigger the investigation.

Accordingly, during this cyber threat determination process, the analyzer module 115 and/or the cyber threat analyst module 120 can also use AI classifiers that look at the features and determine a potential maliciousness based on commonality or overlap with known characteristics of malicious processes/entities. Many factors including anomalies that include unusual and suspicious behavior, and other indicators of processes and events are examined by the one or more AI models 160 trained on potential cyber threats and/or the AI classifiers looking at specific features for their malicious nature in order to make a determination of whether an individual factor and/or whether a chain of anomalies is determined to be likely malicious.

Initially, in this example of activity in an IT network analysis, the rare JA3 hash and/or rare user agent connections for this network coming from a new or unusual process are factored just like in the first wireless domain suspicious wireless signals are considered. These are quickly determined by referencing the one or more of the AI model(s) 160 trained with machine learning on the pattern of life of each device and its associated processes in the system. Next, the analyzer module 115 and/or the cyber threat analyst module 120 can have an external input to ingest threat intelligence from other devices in the network cooperating with the cyber security appliance 100. Next, the analyzer module 115 and/or the cyber threat analyst module 120 can look for other anomalies, such as model breaches, while the AI models trained on potential cyber threats can assist in examining and factoring other anomalies that have occurred over a given timeframe to see if a correlation exists between a series of two or more anomalies occurring within that time frame.

The analyzer module 115 and/or the cyber threat analyst module 120 can combine these Indicators of Compromise (e.g., unusual network JA3, unusual device JA3, . . . ) with many other weak indicators to detect the earliest signs of an emerging threat, including previously unknown threats, without using strict blacklists or hard-coded thresholds. However, the AI classifiers can also routinely look at blacklists, etc. to identify maliciousness of features looked at.

Another example of features may include a deeper analysis of endpoint data. This endpoint data may include domain metadata, which can reveal peculiarities such as one or more indicators of potentially a malicious domain (i.e., its URL). The deeper analysis may assist in confirming an analysis to determine that indeed a cyber threat has been detected. The analysis module can also look at factors of how rare the endpoint connection is, how old the endpoint is, where geographically the endpoint is located, how a security certificate associated with a communication is verified only by an endpoint device or by an external 3rd party, just to name a few additional factors. The analyzer module 115 (and similarly the cyber threat analyst module 120) can then assign weighting given to these factors in the machine learning that can be supervised based on how strongly that characteristic has been found to match up to actual malicious sites in the training.

In another AI classifier to find potentially malicious indicators, the agent analyzer data analysis process in the analyzer module 115 and/or cyber threat analyst module 120 may cooperate with the process identifier classifier to identify all of the additional factors of i) are one or more processes running independently of other processes, ii) are the one or more processes running independent are recent to this network, and iii) are the one or more processes running independent connect to the endpoint, which the endpoint is a rare connection for this network, which are referenced and compared to one or more AI models trained with machine learning on the normal behavior of the pattern of life of the system.

Note, a user agent, such as a browser, can function as a client in a network protocol used in communications within a client-server distributed computing system. In particular, the Hypertext Transfer Protocol (HTTP) identifies the client software originating (an example user agent) the request, using a user-agent header, even when the client is not operated by a user. Note, this identification can be faked, so it is only a weak indicator of the software on its own, but when compared to other observed user agents on the device, this can be used to identify possible software processes responsible for requests.

The analyzer module 115 and/or the cyber threat analyst module 120 may use the agent analyzer data analysis process that detects a potentially malicious agent previously unknown to the system to start an investigation on one or more possible cyber threat hypotheses. The determination and output of this step is what are possible cyber threats that can include or be indicated by the identified abnormal behavior and/or identified suspicious activity identified by the agent analyzer data analysis process.

In an example, the cyber threat analyst module 120 can use the agent analyzer data analysis process and the AI models(s) trained on forming and investigating hypotheses on what are a possible set of cyber threats to use the machine learning and/or set scripts to aid in forming one or more hypotheses to support or refute each hypothesis. The cyber threat analyst module 120 can cooperate with the AI models trained on forming and investigating hypotheses to form an initial set of possible hypotheses, which needs to be intelligently filtered down. The cyber threat analyst module 120 can be configured to use the one or more supervised machine learning models trained on i) agnostic examples of a past history of detection of a multitude of possible types of cyber threat hypotheses previously analyzed by human, who was a cyber security professional, ii) a behavior and input of how a plurality of human cyber security analysts make a decision and analyze a risk level regarding and a probability of a potential cyber threat, iii) steps to take to conduct an investigation start with anomaly via learning how expert humans tackle investigations into specific real and synthesized cyber threats and then the steps taken by the human cyber security professional to narrow down and identify a potential cyber threat, and iv) what type of data and metrics that were helpful to further support or refute each of the types of cyber threats, in order to determine a likelihood of whether the abnormal behavior and/or suspicious activity is either i) malicious or ii) benign?

The cyber threat analyst module 120 using AI models, scripts and/or rules based modules is configured to conduct initial investigations regarding the anomaly of interest, collected additional information to form a chain of potentially related/linked information under analysis and then form one or more hypotheses that could have this chain of information that is potentially related/linked under analysis and then gather additional information in order to refute or support each of the one or more hypotheses.

In an example, a behavioral pattern analysis for identifying what are the unusual behaviors of the network/system/device/user under analysis by the AI (machine learning) models may be as follows. The coordinator module 155 can tie the alerts, activities, and events from, in this example, the email domain to the alerts, activities, and events from the IT network domain. As shown in FIG. 2, a graph 210 of an embodiment of an example chain of unusual behavior for, in this example, the email activities as well as IT activities deviating from a normal pattern of life for this user and/or device in connection with the rest of the system/network under analysis. The cyber threat analyst module 120 and/or analyzer module 115 can cooperate with one or more AI (machine learning) models. The AI model(s) 160 are trained and otherwise configured with mathematical algorithms to infer, for the cyber-threat analysis, 'what is possibly happening with the chain of distinct alerts, activities, and/or events, which came from the unusual pattern,' and then assign a threat risk associated with that distinct item of the chain of alerts and/or events forming the unusual pattern. The unusual pattern can be determined by examining initially what activities/events/alerts that do not fall within the window of what is the normal pattern of life for that network/system/device/user under analysis can be analysed to determine whether that activity is unusual or suspicious. A chain of related activity that can include both unusual activity and activity within a pattern of normal life for that entity can be formed and checked against individual cyber threat hypothesis to determine whether that pattern is indicative of a behavior of a malicious actor-human, program, or other threat. The cyber threat analyst module 120 can go back and pull in some of the normal activities to help support or refute a possible hypothesis of whether that pattern is indicative of a behavior of a malicious actor.

An illustrative example of a behavioral pattern included in the chain is shown in the graph over a time frame of, an example, 7 days. The cyber threat analyst module 120 detects a chain of anomalous behavior of unusual data transfers three times, unusual characteristics in email messages in the monitored system three times which seem to have some causal link to the unusual data transfers. Likewise, twice unusual credentials attempted the unusual behavior of trying to gain access to sensitive areas or malicious IP addresses and the user associated with the unusual credentials trying unusual behavior has a causal link to at least one of those three email messages with unusual characteristics. Again, the cyber security appliance 100 can go back and pull in some of the normal activities to help support or refute a possible hypothesis of whether that pattern is indicative of a behavior of a malicious actor. The analyzer module 115 of FIG. 1 can cooperate with one or more models trained on cyber threats and their behavior to try to determine if a potential cyber threat is causing these unusual behaviors. The cyber threat analyst module 120 can put data and entities into 1) a directed graph and nodes in that graph that are overlapping or close in distance have a good possibility of being related in some manner, 2) a vector diagram, 3) relational database, and 4) other relational techniques that will at least be examined to assist in creating the chain of related activity connected by causal links, such as similar time, similar entity and/or type of entity involved, similar activity, etc., under analysis. If the pattern of behaviors under analysis is believed to be indicative of a malicious actor, then a score of how confident is the system in this assessment of identifying whether a malicious actor caused the unusual pattern is created. Next, also assigned is a threat level score or probability indicative of what level of threat does this malicious actor pose. Lastly, the cyber security appliance 100 is configurable in a user interface, by a user, enabling what type of automatic response actions, if any, the cyber security appliance 100 may take when different types of cyber threats, indicated by the pattern of behaviors under analysis, that are equal to or above a configurable level of threat posed by this malicious actor.

Referring back to FIG. 1, the autonomous response module 140 is configured to take one or more autonomous mitigation actions to mitigate the cyber threat during the cyberattack by the cyber threat. The autonomous response module 140 can reference an AI model trained to track a normal pattern of life for each node of the protected system to perform an autonomous act of, for example, restricting a potentially compromised node having i) an actual indication of compromise and/or ii) merely adjacent to a known compromised node, to merely take actions that are within that node's normal pattern of life to mitigate the cyber threat.

The chain of the individual alerts, activities, and events that form the pattern including one or more unusual or suspicious activities into a distinct item for cyber-threat analysis of that chain of distinct alerts, activities, and/or events. The cyber-threat module may reference the one or more machine learning models trained on, in this example, e-mail threats to identify similar characteristics from the individual alerts and/or events forming the distinct item made up of the chain of alerts and/or events forming the unusual pattern.

Cyber Threat Assessment and Autonomous Actions

In the next step, the analyzer module 115 and/or cyber threat analyst module 120 generates one or more supported possible cyber threat hypotheses from the possible set of cyber threat hypotheses. The analyzer module 115 generates the supporting data and details of why each individual hypothesis is supported or not. The analyzer module 115 can also generate one or more possible cyber threat hypotheses and the supporting data and details of why they were refuted.

In general, the analyzer module 115 cooperates with the following three sources. The analyzer module 115 cooperates with the one or more of the AI model(s) 160 trained on cyber threats to determine whether an anomaly such as the abnormal behavior and/or suspicious activity is either 1) malicious or 2) benign when the potential cyber threat under analysis is previously unknown to the cyber security appliance 100. The analyzer module 115 cooperates with one or more of the AI model(s) 160 trained on a normal behavior of entities in the network under analysis. The analyzer module 115 cooperates with various AI-trained classifiers. With all of these sources, when they input information that indicates a potential cyber threat that is i) severe enough to cause real harm to the network under analysis and/or ii) a close match to known cyber threats, then the analyzer module can make a final determination to confirm that a cyber threat likely exists and send that cyber threat to the assessment module to assess the threat score associated with that cyber threat. Certain model breaches will always trigger a potential cyber threat that the analyzer will compare and confirm the cyber threat.

In the next step, the assessment module 125 with the AI classifiers is configured to cooperate with the analyzer module 115. The analyzer module 115 supplies the identity of the supported possible cyber threat hypotheses from the possible set of cyber threat hypotheses to the assessment module 125. The assessment module 125 with the AI classifiers cooperates with the one or more of the AI model(s) 160 trained on possible cyber threats can make a determination on whether a cyber threat exists and what level of severity is associated with that cyber threat. The assessment module 125 with the AI classifiers cooperates with one or more of the AI model(s) 160 trained on possible cyber threats in order assign a numerical assessment of a given cyber threat hypothesis that was found likely to be supported by the analyzer module 115 with the one or more data analysis processes, via the abnormal behavior, the suspicious activity, or the collection of system data points. The assessment module 125 with the AI classifiers output can be a score (ranked number system, probability, etc.) that a given identified process is likely a malicious process. The assessment module 125 with the AI classifiers can be configured to assign a numerical assessment, such as a probability, of a given cyber threat hypothesis that is supported and a threat level posed by that cyber threat hypothesis which was found likely to be supported by the analyzer module 115, which includes the abnormal behavior or suspicious activity as well as one or more of the collection of system data points, with the one or more AI models trained on possible cyber threats.

The cyber threat analyst module 120 in the AI-based cyber security appliance 100 component provides an advantage over competitors' products as it reduces the time taken for cyber security investigations, provides an alternative to manpower for small organizations and improves detection (and remediation) capabilities within the cyber security appliance 100. The AI-based, cyber threat analyst module 120 performs its own computation of threat and identifies interesting network events with one or more processors. These methods of detection and identification of threat all add to the above capabilities that make the cyber threat analyst module 120 a desirable part of the cyber security appliance 100. The cyber threat analyst module 120 offers a method of prioritizing which is not just a summary or highest score alert of an event evaluated by itself equals the worst and prevents more complex attacks being missed because their composite parts/individual threats only produced low-level alerts.

The AI classifiers can be part of the assessment module 125, which scores the outputs of the analyzer module 115. Again, as for the other AI classifiers discussed, the AI classifier can be coded to take in multiple pieces of information about an entity, object, and/or thing and based on its training and then output a prediction about the entity, object, or thing. Given one or more inputs, the AI classifier model will try to predict the value of one or more outcomes. The AI classifiers cooperate with the range of data analysis processes that produce features for the AI classifiers. The various techniques cooperating here allow anomaly detection and assessment of a cyber threat level posed by a given anomaly; but more importantly, an overall cyber threat level posed by a series/chain of correlated anomalies under analysis.

In the next step, the formatting module 130 can generate an output such as a printed or electronic report with the relevant data. The formatting module 130 can cooperate with both the analyzer module 115 and the assessment module 125 depending on what the user wants to be reported. The formatting module 130 is configured to format, present a rank for, and output one or more supported possible cyber threat hypotheses from the assessment module into a formalized report, from a one or more report templates populated with the data for that incident. The formatting module 130 is configured to format, present a rank for, and output one or more detected cyber threats from the analyzer module or from the assessment module into a formalized report, from a one or more report templates populated with the data for that incident. Many different types of formalized report templates exist to be populated with data and can be outputted in an easily understandable format for a human user's consumption. The formalized report on the template is outputted for a human user's consumption in a medium of any of 1) printable report, 2) presented digitally on a user interface, 3) in a machine-readable format for further use in machine-learning reinforcement and refinement, or 4) any combination of the three. The formatting module 130 is further configured to generate a textual write up of an incident report in the formalized report for a wide range of breaches of normal behavior, used by the AI models trained with machine learning on the normal behavior of the system, based on analyzing previous reports with one or more models trained with machine learning on assessing and populating relevant data into the incident report corresponding to each possible cyber threat. The formatting module 130 can generate a threat incident report in the formalized report from a multitude of a dynamic human-supplied and/or machine created templates corresponding to different types of cyber threats, each template corresponding to different types of cyber threats that vary in format, style, and standard fields in the multitude of templates. The formatting module 130 can populate a given template with relevant data, graphs, or other information as appropriate in various specified fields, along with a ranking of a likelihood of whether that hypothesis cyber threat is supported and its threat severity level for each of the supported cyber threat hypotheses, and then output the formatted threat incident report with the ranking of each supported cyber threat hypothesis, which is presented digitally on the user interface and/or printed as the printable report.

The autonomous response module 140 can reference an AI model trained to track a normal pattern of life for each node of the protected system to perform an autonomous act of, for example, restricting a potentially compromised node having i) an actual indication of compromise and/or ii) merely adjacent to a known compromised node, to merely take actions that are within that node's normal pattern of life to mitigate the cyber threat.

The chain of the individual alerts, activities, and events that form the pattern including one or more unusual or suspicious activities into a distinct item for cyber-threat analysis of that chain of distinct alerts, activities, and/or events. The cyber-threat module may reference the one or more machine learning models trained on, in this example, e-mail threats to identify similar characteristics from the individual alerts and/or events forming the distinct item made up of the chain of alerts and/or events forming the unusual pattern. In the next step, the assessment module 125 with the AI classifiers, once armed with the knowledge that malicious activity is likely occurring/is associated with a given process from the analyzer module 115, then cooperates with the autonomous response module 140 to take an autonomous action such as i) deny access in or out of the device or the network ii) shutdown activities involving a detected malicious agent, iii) restrict devices and/or user's to merely operate within their particular normal pattern of life, iv) remove some user privileges/permissions associated with the compromised user account, v) conduct an offensive countermeasure, etc.

The autonomous response module 140, rather than a human taking an action, can be configured to cause one or more rapid autonomous actions in response to be taken to counter the cyber threat. A user interface for the response module can program the autonomous response module 140 i) to merely make a suggested response to take to counter the cyber threat that will be presented on a display screen and/or sent by a notice to an enterprise security administrator for explicit authorization when the cyber threat is detected or ii) to autonomously take a response to counter the cyber threat without a need for a human to approve the response when the cyber threat is detected. The autonomous response module 140 will then send a notice of the autonomous response as well as display the autonomous response taken on the display screen. Example autonomous responses may include cut off connections, shutdown devices, change the privileges of users, delete, and remove malicious links in emails, slow down a transfer rate, cooperate with other security devices such as a firewall to trigger its autonomous actions, conduct a DoS attack, and other autonomous actions against the devices and/or users. The autonomous response module 140 uses one or more of the AI model(s) 160 that are configured to intelligently work with other third-party defense systems in that customer's network against threats. The autonomous response module 140 can send its own protocol commands to devices and/or take actions on its own. In addition, the autonomous response module 140 uses the one or more of the AI model(s) 160 to orchestrate with other third-party defense systems to create a unified defense response against a detected threat within or external to that customer's network. The autonomous response module 140 can be an autonomous self-learning digital response coordinator that is trained specifically to control and reconfigure the actions of traditional legacy computer defenses (e.g., firewalls, switches, proxy servers, etc.) to contain threats propagated by, or enabled by, networks and the internet. The cyber threat analyst module 120 and/or assessment module 125 can cooperate with the autonomous response module 140 to cause one or more autonomous actions in response to be taken to counter the cyber threat, improves computing devices in the system by limiting an impact of the cyber threat from consuming unauthorized CPU cycles, memory space, and power consumption in the computing devices via responding to the cyber threat without waiting for some human intervention. The trigger module 105, analyzer module 115, assessment module 125, the cyber threat analyst module 120, and formatting module 130 cooperate to improve the analysis and formalized report generation with less repetition to consume CPU cycles with greater efficiency than humans repetitively going through these steps and re-duplicating steps to filter and rank the one or more supported possible cyber threat hypotheses from the possible set of cyber threat hypotheses.

Offensive Countermeasure Operations by Inoculation Extension

Figure 3:
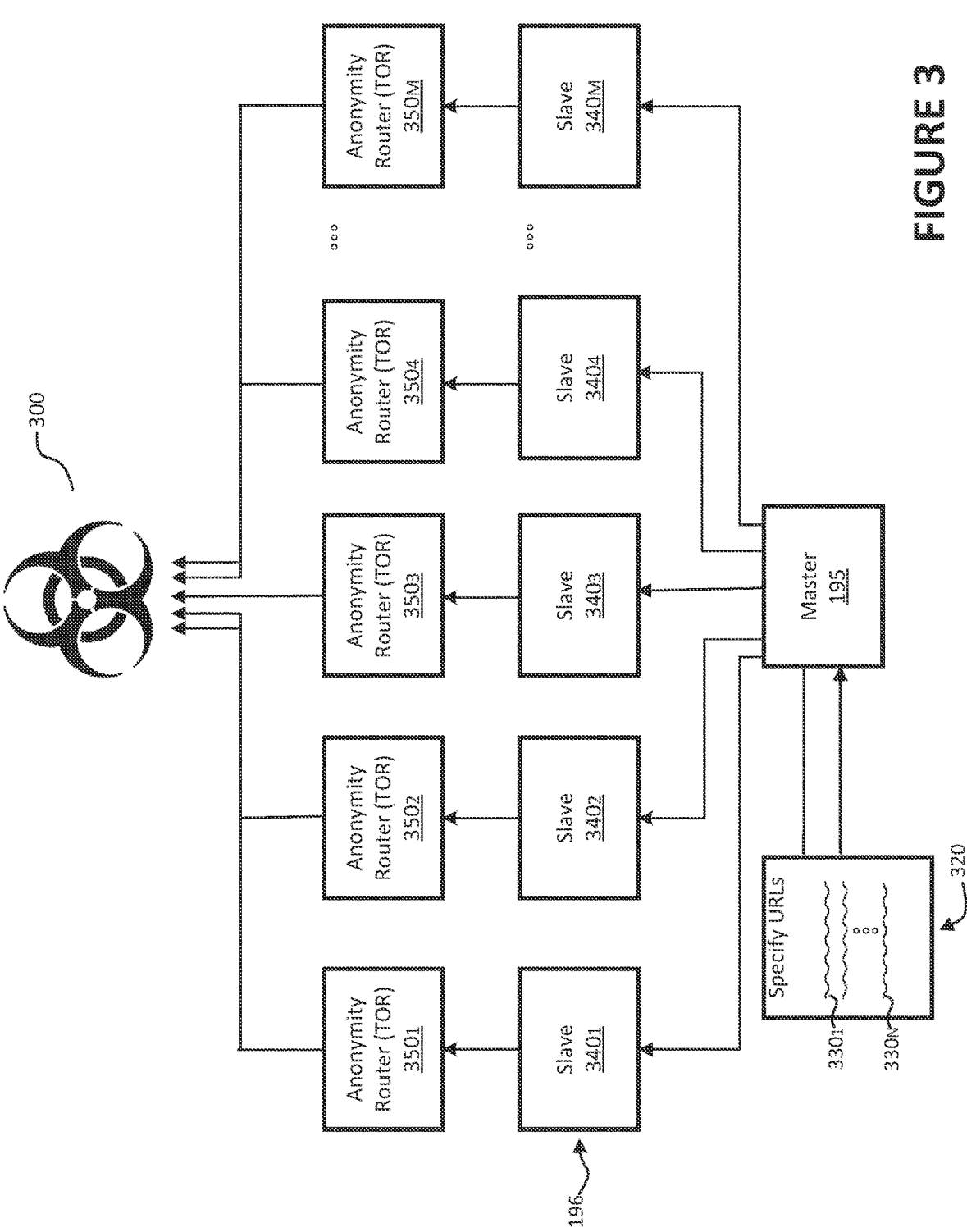
FIG. 3 illustrates an embodiment of the logical architecture representative of the operations performed by the disablement module of FIG. 1.

Referring now to FIG. 3, an illustrative embodiment of the logical architecture representative of the operations performed by the disablement module 194 of FIG. 1 is shown. For this embodiment, the disablement module 194 is configured to perform an offensive countermeasure on an identified malicious endpoint (e.g., malicious server) 300, such as conducting a Denial of Service (DoS) attack designed to disable communications from the malicious server 300 based on exhaustion of available sockets relied upon by the malicious server 300 for network communications. More specifically, the disablement module 194 is configured to establish and maintain active communications sessions (connections) 310 with the malicious server 300, without any intent on releasing the communication sessions 310. By establishing and maintaining active connections with all (or at least most) of the sockets of the malicious server, the cyber security appliance 100 is disabling (or at least substantially hindering) operations of the malicious server 300 as it will not be able to effectively communicate with other targeted devices.

According to one embodiment of the disclosure, the disablement module 194 features the master component 195

(e.g., software instance, etc.) and a plurality of slave components 196 (e.g., software instances, etc.). The master component 195 is provided network addressing information (e.g., URLs) associated with endpoints that classified as malicious endpoints from analytics conducted by the cyber security appliance 100 or analytics conducted by other computing devices (e.g., another cyber security appliance within the enterprise network, global intelligence reports, third-party analytics, etc.). For example, based on a frequency of activities and a prescribed level of confidence of such activities are malicious (e.g., phishing, attempted credential theft, etc.), the URL associated with the malicious endpoint is included in a data store 320 accessed by the master component 195. The data store 320, which may be a JavaScript Object Notation (JSON) file for example, may maintain URLs $330_1$-$330_N$ (N≥1) associated with malicious endpoints targeted for an offensive countermeasure by the cyber security appliance 100.

The master component 195 may be configured to distribute a targeted URL (e.g., URL $330_1$) across the slave components 196. A first slave component $340_1$ is configured to establish a communication session (connection) to the malicious server 300. For this communication, a maximum throughput of less than 500 kilobytes per second (kbps) is maintained to enable the first slave component $340_1$ to utilize a first anonymity router module $350_1$ such as open-source routing software (Tor). Tor $350_1$ enables anonymous communications from the first slave component $340_1$. Similarly, other slave components $340_2$-$340_M$ (e.g., M≥3) are configured to establish communication sessions (connections) via Tor $350_2$-$350_M$ with the malicious server 300 until a connection denial (error) from the malicious server 300 is received by one of the slave component $340_2$-$340_M$. This error denotes that no further communications with the malicious server 300 are permitted, and as a result, the malicious server 300 is overloaded so that it is unable to communicate with computing devices that are vulnerable to a cyberattack. Thereafter, any remaining slave components (e.g., slave components $340_4$-$340_M$ where slave component $340_3$ receives the connection denial) may be configured to establish communication sessions (connection) to a different malicious endpoint. As a result, the disablement module 194 may be configured to disable a single malicious endpoint at a time or may be configured to disable multiple (two or more) different malicious endpoints concurrently (i.e., at least partially overlapping in time).

As yet another embodiment of the disclosure, each of the slave components 196 may be responsible for establishing and maintaining multiple communication sessions for each URL, and as a result, the URLs may be evenly distributed across these slave components 196. For this example, the first slave component $340_1$ may be configured to establish multiple communication sessions (via same or different Tor instances) to the malicious server 300 accessed using the first URL $330_1$. The generation of new communication sessions continues until receipt of a connection denial (error) from the malicious server 300 after multiple communication sessions are established and subsequently maintained active by the first slave component $340_1$. Similarly, other slave component $340_2$-$340_M$ are configured to establish communication sessions (connections) with malicious endpoints accessed through other URLs $330_2$, $330_3$, etc.

As yet another alternative embodiment, a URL may be distributed to a particular subset of slave components based on metrics associated with the malicious endpoint. For example, the first URL $330_1$ associated with the malicious server 300 may be directed to slave components $340_1$, $340_3$, $340_M$ based on the endpoint type (e.g., server, router, etc.), OS-type utilized by the malicious server 300, geography of the malicious server 300, or other metrics.

Fleetwide Dissemination of Malicious Server Fingerprint

Figure 4:
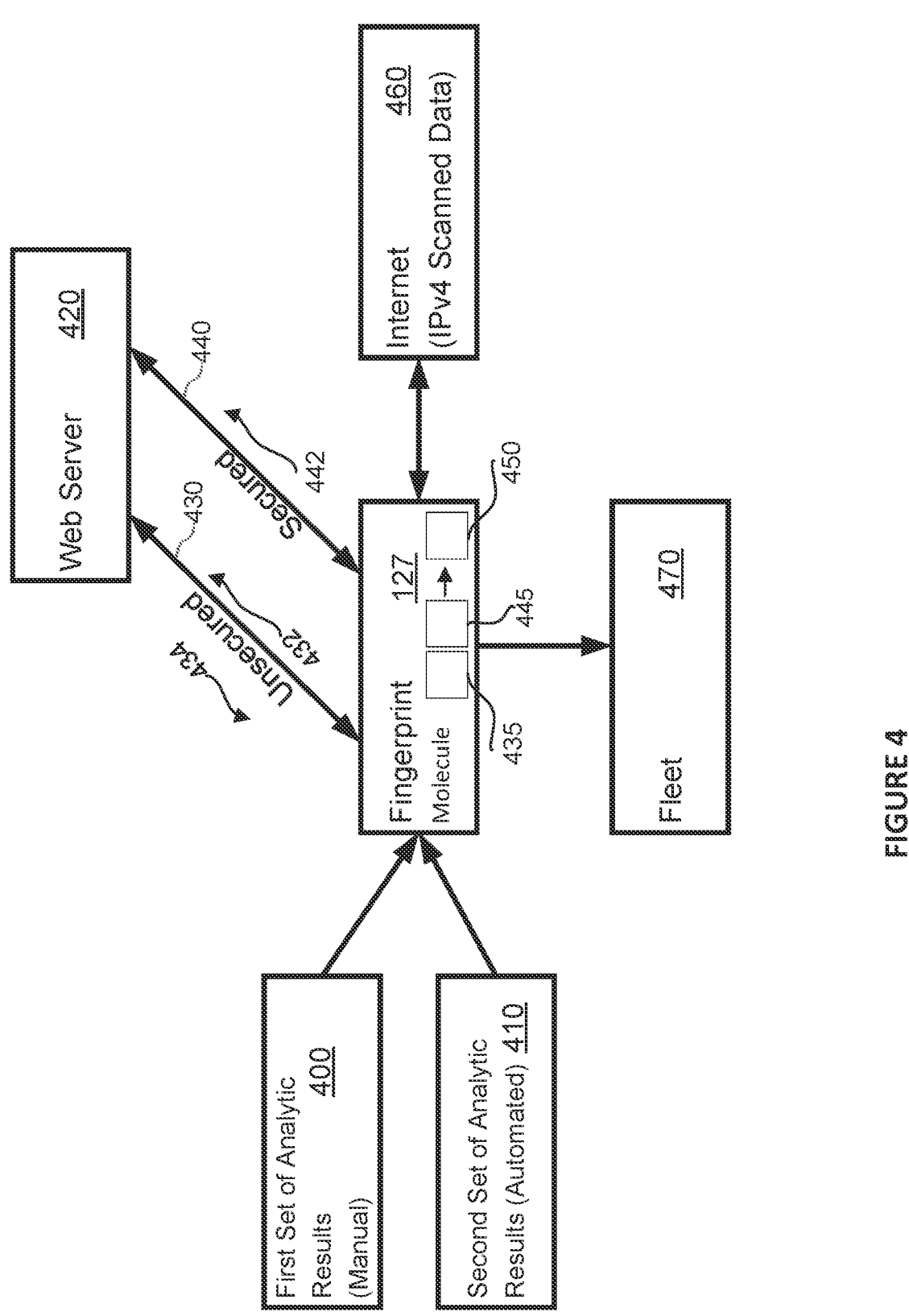
FIG. 4 illustrates a block diagram of a fingerprint module of FIG. 1 working with the other modules of the cyber security appliance.

Referring to FIG. 4, a fingerprint module 127 is configured to receive a hostname for a malicious endpoint (e.g., web server) from the analyzer module 115. The analysis conducted to determine whether the web server is malicious can be based on a first set of analytic results 400 from information gathered via manual reporting or a second set of analytic results 410 from information gathered via automated reporting. The manual reporting can occur by inputting the hostname of the web server 420 as a known malicious web server provided from a person or entity (e.g., Security Operations Center "SOC") and automated reporting that supplies identities of known malicious web servers (including hostnames) in order to identify the malicious web server.

The fingerprint module 127 may be configured to generate a web server fingerprint through JARM, namely an active Transport Layer Security (TLS) server fingerprinting tool. As an illustrative example, the fingerprint module 127 may be configured to generate an unencrypted target fingerprint based on intransient characteristics of the malicious web server 420 gleaned from unencrypted hypertext transfer protocol communications 430. Example of the intransient characteristics may include intransient hypertext transfer protocol (HTTP) headers or server characteristics such as operating system (OS), OS version, libraries used, order of library usage, or the like.

The fingerprint module 127 can send a series of unencrypted HTTP requests to generate an unencrypted target fingerprint 435. More specifically, the fingerprint module 127 may be configured to generate the series of unencrypted HTTP requests 432 by varying source identifiers for the series of unencrypted HTTP requests such as accessing a proxy to vary the source identifiers. Information from responses 434 to these HTTP requests can be used as a malicious web server's fingerprint. Note the URL of the malicious web server 420 can change but some of the characteristics of the malicious web server 420, proxies used by the malicious web server, and the malicious web server itself often remain the same from the same bad actor.

Additionally, or in the alternative, the fingerprint module 127 can generate an encrypted target fingerprint 445 for the malicious web server based on encrypted secure connection communications 440. The fingerprint module 127 can send a series of encrypted connection protocol requests 442 to generate the encrypted target fingerprint 445. The fingerprint module 127 can generate a list of encryption ciphers for the series of encrypted secure connection requests to generate the encrypted target fingerprint 445. The fingerprint module 127 can remove a selected encryption cipher from the list of encryption ciphers for future requests in the series of encrypted secure connection requests to determine encryption cipher order.

The fingerprint module 127 can generate a web server fingerprint (referred to as a "T1 fingerprint" 450) based on the encrypted target fingerprint 445 and/or the unencrypted target fingerprint 435. For a JARM deployment for example, specific server attributes included in the responses to the HTTP requests (e.g., TLS Server Hello responses to multiple TLS Client Hello packets), inclusive of the intransient characteristics of the targeted server, undergo a fuzzy hash function to produce the web server fingerprint. Thereafter, the fingerprint module 127 can scan a representational portion of an internet of servers (referred to as "IPv4 scanned data 460") to match servers to the T1 fingerprint.

The fingerprint module 127 can generate a list of suspicious servers based on matches to the T1 fingerprint. The autonomous response module 140 is further configured to inoculate a fleet of network devices 470 against a cyberattack using the encrypted target fingerprint 445 and/or the unencrypted target fingerprint 435. The autonomous response module 140 of FIG. 1 is further configured to push the list of suspicious web servers to the fleet of network devices.

The fingerprint module 127 may be further configured to generate a secondary (T2) fingerprint, namely a fingerprint that features a higher level of uniqueness to a server than the T1 fingerprint in order to reduce the number of queries (HTTP requests) to identify the malicious web server 420. The T2 fingerprint identifies the malicious web server as well as other servers that are derived from or associated with the malicious web server. The T2 fingerprints may be compared with the list of suspicious servers within the IPv4 scanned data 460 matching the T1 fingerprint. The T2 fingerprints may be provided to the fleet or the wider community or used to eliminate or mitigate cyber threats caused by the malicious web server and related web servers.

Figure 5:
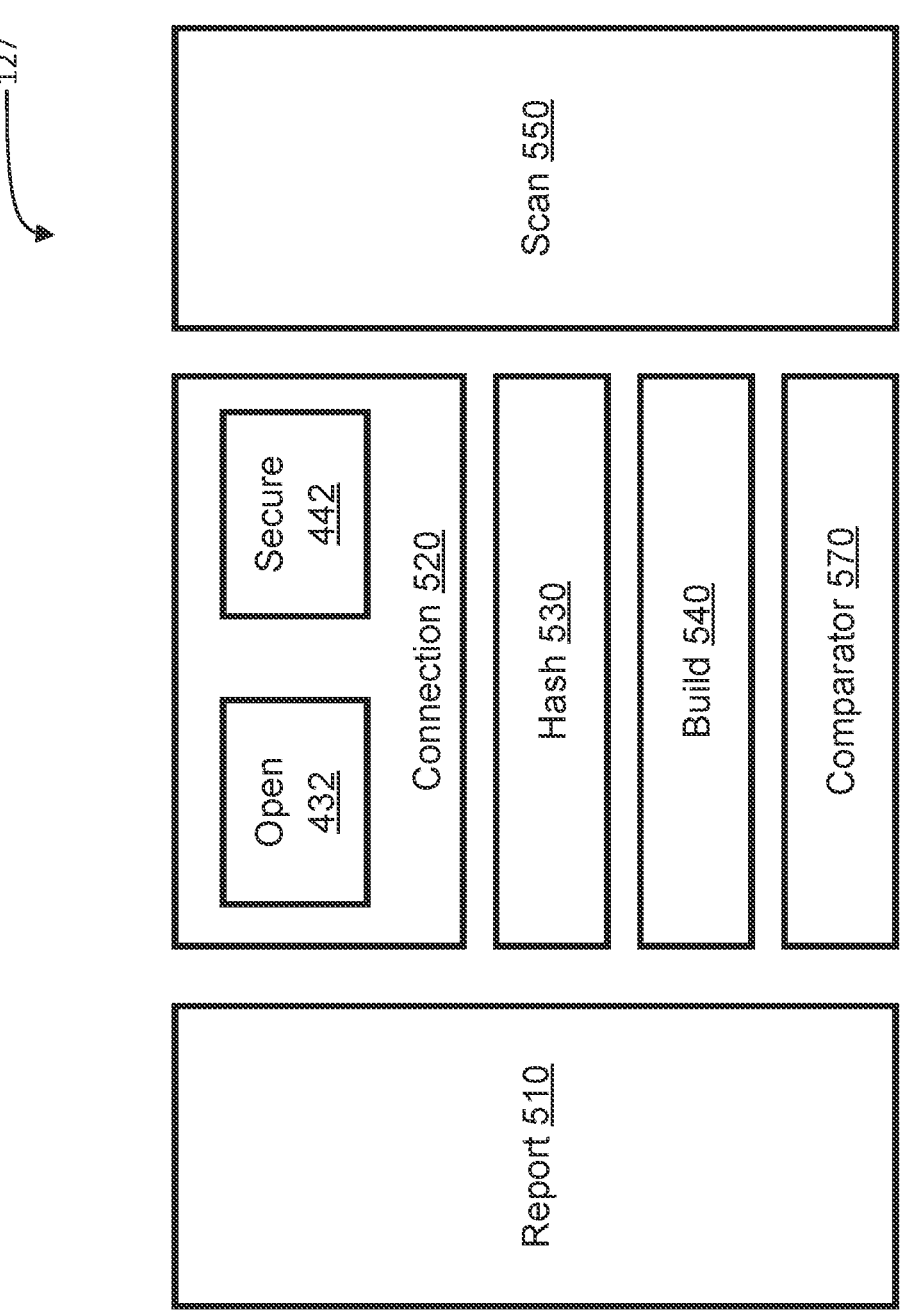
FIG. 5 illustrates a block diagram of an embodiment of the fingerprint module of FIGS. 1 and 4.

Referring now to FIG. 5, as described in further detail in U.S. Published Patent Application No. 2022/0224716 and incorporated by reference herein, the fingerprint module 127 may include a report sub-module 510, a connection sub-module 520, a hash sub-module 530, a build sub-module 540, a scan sub-module 550, and a comparator sub-module 560. Note, the cyber analyst module and/or analyzer module may also be configured to include one or more of these sub-modules.

The report sub-module 510 can receive a hostname (such as an endpoint IP address, a server name, etc.) for a known malicious web server in order to identify, for example, a new set of IP addresses/endpoints associated with this previously known malicious web server.

The connection sub-module 520 can be coded to send a series of unencrypted connection protocol requests to the malicious (web) server in order to obtain the intransient characteristics of the malicious server as well as to send a series of encrypted secure connection protocol requests to the malicious server in order to obtain characteristics of secure communications with the malicious server. The connection sub-module 520 can vary source identifiers of the user agent and/or user device initiating the connection protocol requests for the series of unencrypted connection protocol requests to the malicious server to obtain different host data from the malicious server to build up the unencrypted fingerprint. The connection sub-module 520 can also utilize a proxy service to vary the source identifiers for the series of unencrypted connection protocol requests 432 of FIG. 4 to obtain additional characteristics of the malicious server. The unencrypted connection protocol requests can be in internet protocol communications, such as HTTP, TCP/IP, FTP, UDP/IP, etc. The encrypted connection protocol requests 442 of FIG. 4 can be in internet protocol communications, such as HTTPS. The connection sub-module 520 can cooperate with the comparator sub-module 560 to analyze tendencies of endpoints (in particular user agents) and their normal connection pattern to a set of endpoints each user agent communicates with. The comparator sub-module 560 can determine, measured against a threshold amount) when the connection pattern to a particular endpoint IP address by a particular user agent under analysis is atypical/not normal with regard to other similar user agents, and then consider that user agent, under analysis, as suspicious when it attempts to establish a protocol connection with the particular endpoint IP address. Accordingly, the comparator sub-module 560 can cooperate with the AI classifier trained to predict a user-agent on a client device that normally will initiate at least encrypted connections with that endpoint in order to establish the threshold amount.

The hash sub-module 530 can be coded to generate an unencrypted target fingerprint based on the intransient characteristics of the malicious web server 420 of FIG. 4 gleaned from the series of unencrypted connection protocol requests 432 of FIG. 4. The hash sub-module 530 can be coded to also generate an encrypted target fingerprint for the malicious server based on the series of encrypted connection protocol requests 442 of FIG. 4. The hash sub-module 530 can cooperate with the connection sub-module 520 to generate/enumerate a list and order of the preference for encryption ciphers used by a server for the malicious server for the series of encrypted secure connection protocol requests to supply some of the characteristics of the malicious server in the encrypted target fingerprint. Each time a secure connection protocol request is made the encryption cipher offered by the malicious server and/or suspicious IP address under analysis is noted. In addition, the module can note encryption ciphers already offered and request to use another encryption cipher in order to assist in creating the encryption cipher order.

The build sub-module 540 can build a server (T1) fingerprint for the malicious server from both the intransient characteristics of the malicious server from the unencrypted target fingerprint and the characteristics of the secure communications with the malicious server from the unencrypted target fingerprint.

The comparator sub-module 570 can determine a set of one or more suspicious IP addresses that share a substantial similarity to information derivable from the combined web server fingerprint. A scan sub-module 550 is coded to cooperate with the comparator sub-module 570. The scan sub-module 550 is coded to generate a scan of IP addresses, such as a representational portion of devices (e.g., servers) on the Internet. The scan sub-module 550 can cooperate with the comparator sub-module 570 such that the set of one or more suspicious IP addresses is created based on an amount of matches of shared characteristics over a threshold amount to information derived from the server fingerprint for the malicious server, which then indicates that each of the IP addresses put into the set of the one or more suspicious IP addresses are very likely to be associated with a previously known malicious server. For example, a threshold amount of indicators can be a number (e.g., four or more) and/or a percentage (e.g., 70%) of i) the intransient characteristics of the malicious server from the unencrypted target fingerprint and/or ii) the characteristics of the secure communications with the malicious server from the encrypted target fingerprint match up with characteristics found in the suspicious IP address under analysis. The scanned IP addresses that are suspicious do not need to match up exactly to all of (e.g., 10 out of 10) the characteristics of the known malicious server. However, the IP address that is suspicious shares a large enough number (6 out of 10) and/or percentage of characteristics that match up with the characteristics of the known malicious server, such that this IP address under analysis is likely associated with the known malicious server. In addition, suspicious IP addresses can be added and/or removed based on a further human investigation into the set of suspicious IP addresses associated with a previously known malicious server. Thus, the scan sub-module 550 can cooperate with the comparator sub-module 570 to analyze characteristics of scanned IP addresses compared to characteristics of a known malicious server.

The autonomous response module 140 of FIG. 1 can cooperate with the fingerprint module 127 to inoculate a fleet of network devices against a cyberattack using the set of one or more IP addresses based on the combined web server fingerprint in order to preemptively alert the fleet of network devices to future sources of danger from the cyberattack from user agents attempting to establish a connection protocol request with to a suspicious IP address in the set of one or more IP addresses. The suspicious IP addresses have enough shared characteristics to likely be associated with the previously known malicious server.

Based on the foregoing, the scan sub-module 550 is configured to cooperate with the comparator sub-module 570 to determine when an amount of characteristics of a particular IP address under analysis matches up, over a threshold amount, to a known malicious server, and then consider that IP address under analysis as suspicious. As discussed, the comparator sub-module 570 can cooperate with the autonomous response module 140 of FIG. 1 to determine when a particular user agent deemed suspicious attempts to make a protocol connection with a particular IP address deemed as suspicious because of the amount characteristics in common with the known malicious server. The autonomous response module can then autonomously prevent the protocol connection from occurring.

Referring now to FIG. 6, an embodiment of the operations of the AI-based cyber security appliance 100, including the fingerprint module 127, to generate the T2 fingerprint is shown. Herein, a malicious endpoint is identified based on internal determinations by the cyber security application and/or external sources such as a SOC or other threat intelligence sources (block 610). Thereafter, the T1 fingerprint is created based on JARM and intransient characteristics of the identified malicious web server 420, where the intransient characteristics are gleaned from HTTP communications (block 620). The T1 fingerprint is compared with network addressing information (IP addressing) of the full IPv4 data to identify a matching subset of the IPV4 data (IPv4 scanned data), as shown in block 630.

Thereafter, the scanning is expanded through creation of the T2 fingerprint (block 640). According to one embodiment of the disclosure, the T2 fingerprint may be created as a hash result performed on a combination of (i) data obtained from full port scan of a targeted malicious server, (ii) HTTP path enumeration (with method mutation), (iii) server configuration parameters (e.g., maximum header length, etc.), and (iv) content (e.g., rare byte sequences, etc.) (block 650). The candidate T2 fingerprint data is then analyzed using random samples from the matching suspicious servers with a general aim to minimize the number of queries required to uniquely identify the server technology (block 660). Once the T2 fingerprint is generated, the requests required to identify matches are delivered to the scanning infrastructure and will cover the T1 matched subset of the IPV4 scanned data (block 670). T2 fingerprint matches can then be delivered to the fleet or wider community to neutralize via offensive countermeasures as described above (block 680).

Appliance Platform Embodiment and Deployments

Figure 7:
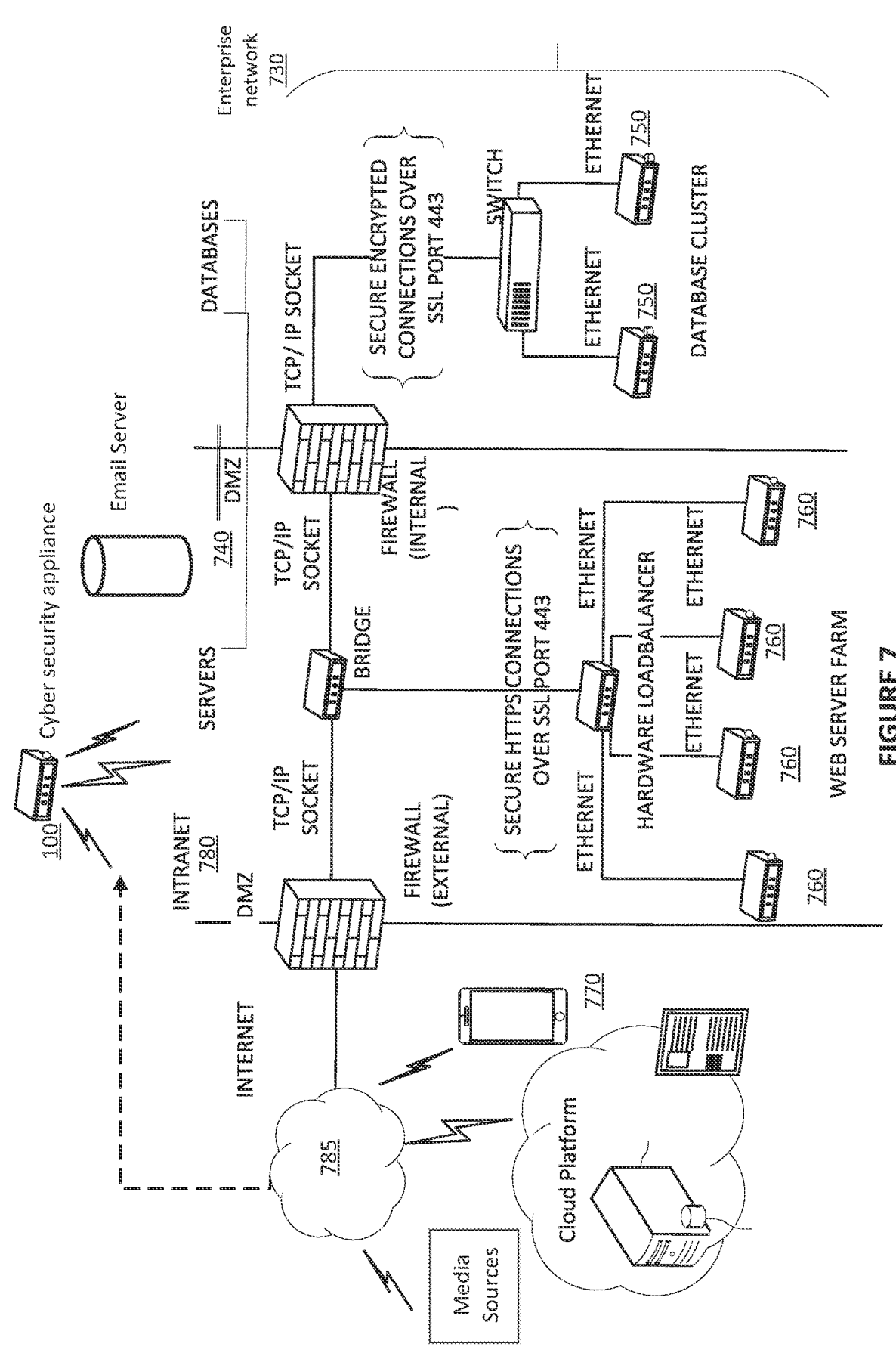
FIG. 7 illustrates an embodiment of the AI-based cyber security appliance plugging in as an appliance platform to protect a system.

Referring to FIG. 7, an embodiment of the AI-based cyber security appliance 100 plugging in as an appliance platform to protect a system is shown. The cyber security appliance 100 is part of an enterprise network 730, which may further include one or more computing devices 740 such as database servers 750, web servers 760, networking devices 770 (e.g., bridge, switch, router, load-balancers, gateways, and/or firewalls), consumer electronic devices 780 with connectivity to resources within the enterprise network 730 as well as a publicly accessible network 785 (e.g., the Internet). The consumer electronic devices 780 may include, but are not limited or restricted to desktop computers, laptops, smart phones, tablets, wearables, smart appliances, or the like. The security controls operate as probes and detectors that are configured to monitor, for example, network-based activity (e.g., email activity, TCP/IP communications, text or Short Message Service (SMS) activity, etc.) and computing device activity (e.g., download activity based on volume, day, time of day, etc.); credential update/modification activity (e.g., credential changes, failed access attempts to a resource, etc.); and/or resource activity (e.g., attempted/successful accesses to enterprise resources, etc.). The security controls provide the monitored data (or a version of the monitored data) as input into the modules of the cyber security appliance 100 to determine what is occurring in each domain individually.

Referring now to FIG. 8, an example Artificial Intelligence based cyber security appliance 100 using a cyber threat analyst module 104 to protect an enterprise network (system) 800. The enterprise network 800 uses the cyber security appliance 100 of FIG. 1. The system depicted is a simplified illustration, which is provided for ease of explanation.

According to this embodiment, the enterprise network 800 featuring a plurality of computing systems is shown, such as computer systems 810 and 840, where one or more of these computer systems 810 and/or 840 may deploy the AI-based, cyber security appliance 100 of FIG. 1 to protect the enterprise. Herein, the enterprise network 800 comprises a first computer system 810 within a building, which uses the threat detection system to detect and thereby attempt to prevent threats to computing devices within its bounds. The first computer system 810 comprises three computing devices 1, 2, 3, a local server 4, and a multifunctional device (MFD) 5 that provides printing, scanning and facsimile functionalities to each of the computers 1, 2, 3. All of the devices within the first computer system 810 are communicatively coupled via a first Local Area Network (LAN) 6. Consequently, all of the computing devices 1, 2, 3 are able to access the local server 4 via the first LAN 6 and use the functionalities of the MFD 5 via the LAN 6. The first LAN 6 of the first computer system 810 is connected to the Internet 820, which in turn provides computing devices 1, 2, 3 with access to a multitude of other computing devices, including a server 830 and a second computer system 840. The second computer system 840 also includes two computing devices 41, 42, connected by a second LAN 43.

In this exemplary embodiment of the cyber security appliance 100, the first computing device 1 on the first computer system 810 has the electronic hardware, modules, models, and various software processes of the cyber security appliance 100; and therefore, runs threat detection for detecting threats to the first computer system 810. As such, the first computing device 1 includes one or more processors arranged to run the steps of the process described herein, memory storage components required to store information related to the running of the process, as well as one or more network interfaces for collecting information from various security controls (e.g., sensors, probes, etc.) collecting data associated with the enterprise network 800 under analysis.

The cyber security appliance 100 in the first computing device 1 builds and maintains a dynamic, ever-changing model of the 'normal behavior' of each user and machine within the first computer system 810. The approach is based on Bayesian mathematics, and monitors all interactions, events, and communications within the first computer system 810—which computing device is talking to which, files that have been created, networks that are being accessed. For example, a second computing device 2 is based in a company's San Francisco office and operated by a marketing employee who regularly accesses the marketing network, usually communicates with machines in the company's U.K. office in the second computer system 840 between 9.30 AM and midday and is active from about 8:30 AM until 6 PM. The same employee virtually never accesses the employee time sheets, very rarely connects to the company's Atlanta network, and has no dealings in South-East Asia. The cyber security appliance 100 takes all the information that is available relating to this employee and establishes a 'pattern of life' for that person and the devices used by that person in that system, which is dynamically updated as more information is gathered. The model of the normal pattern of life for an entity in the enterprise network 800 under analysis is used as a moving benchmark, allowing the cyber security appliance 100 to spot behavior on the enterprise network 800 seems to fall outside of this normal pattern of life, and flags this behavior as anomalous, requiring further investigation and/or autonomous action.

The cyber security appliance 100 is built to deal with the fact that today's attackers are getting stealthier, and an attacker/malicious agent may be 'hiding' in a system to ensure that they avoid raising suspicion in an end user, such as by slowing their machine down. As shown in FIG. 1, AI model(s) 160 in the cyber security appliance 100 builds a sophisticated 'pattern of life'—that understands what represents normality for every person, device, and network activity in the system being protected by the cyber security appliance 100. The self-learning algorithms in the AI can, for example, understand each node's (user account, device, etc.) in an organization's normal patterns of life in about a week, and grows more bespoke with every passing minute. Conventional AI typically relies solely on identifying threats based on historical attack data and reported techniques, requiring data to be cleansed, labelled, and moved to a centralized repository. The detection engine self-learning AI can learn "on the job" from real-world data occurring in the system and constantly evolves its understanding as the system's environment changes. The Artificial Intelligence can use machine learning algorithms to analyze patterns and 'learn' what is the 'normal behavior' of the enterprise network (system) 800 by analyzing data on the activity on the enterprise network (system) 800 at the device and employee level. The unsupervised machine learning does not need humans to supervise the learning in the model but rather discovers hidden patterns or data groupings without the need for human intervention. The unsupervised machine learning discovers the patterns and related information using the unlabeled data monitored in the system itself. Unsupervised learning algorithms can include clustering, anomaly detection, neural networks, etc. Unsupervised learning can break down features of what it is analyzing (e.g., a network node of a device or user account), which can be useful for categorization, and then identify what else has similar or overlapping feature sets matching to what it is analyzing.

The cyber security appliance 100 can use unsupervised machine learning to works things out without pre-defined labels. In the case of sorting a series of different entities, such as different devices, the system analyzes the information and works out the different classes of devices. This allows the enterprise network (system) 800 to handle the unexpected and embrace uncertainty when new entities and classes are examined. The modules and models of the cyber security appliance 100 do not always know what they are looking for but can independently classify data and detect compelling patterns. The cyber security appliance 100's unsupervised machine learning methods do not require training data with pre-defined labels. Instead, they are able to identify key patterns and trends in the data, without the need for human input. The advantage of unsupervised learning in this system is that it allows computers to go beyond what their programmers already know and discover previously unknown relationships. The unsupervised machine learning methods can use a probabilistic approach based on a Bayesian framework. The machine learning allows the cyber security appliance 100 to integrate a substantial number of weak indicators/low threat values by themselves of potentially anomalous network behavior to produce a single clear overall measure of these correlated anomalies to determine how likely a network device is to be compromised. This probabilistic mathematical approach provides an ability to understand important information, amid the noise of the network-even when it does not know what it is looking for.

The cyber security appliance 100 can use a Recursive Bayesian Estimation to combine these multiple analyzes of different measures of network behavior to generate a single overall/comprehensive picture of the state of each device, the cyber security appliance 100 takes advantage of the power of Recursive Bayesian Estimation (RBE) via an implementation of the Bayes filter. Using RBE, the cyber security appliance 100's AI models are able to constantly adapt themselves, in a computationally efficient manner, as new information becomes available to the system. The AI model(s) of the cyber security appliance 100 may be configured to continually recalculate threat levels in the light of new evidence, identifying changing attack behaviors where conventional signature-based methods fall down.

Training an AI model can be accomplished by having the model learn good values for all of the weights and the bias for labeled examples created by the system, and in this case; starting with no labels initially. A goal of the training of the AI model can be to find a set of weights and biases that have low loss, on average, across all examples.

The AI classifier can receive supervised machine learning with a labeled data set to learn to perform their task as discussed herein. An anomaly detection technique that can be used is supervised anomaly detection that requires a data set that has been labeled as "normal" and "abnormal" and involves training a classifier. Another anomaly detection technique that can be used is an unsupervised anomaly detection that detects anomalies in an unlabeled test data set under the assumption that the majority of the instances in the data set are normal, by looking for instances that seem to fit least to the remainder of the data set. The AI model representing normal behavior from a given normal training data set can detect anomalies by establishing the normal pattern and then test the likelihood of a test instance under analysis to be generated by the AI model. Anomaly detection can identify rare items, events or observations which raise suspicions by differing significantly from the majority of the data, which includes rare objects as well as things like unexpected bursts in activity.

The method and system are arranged to be performed by one or more processing components with any portions of software stored in an executable format on a computer readable medium. Thus, any portions of the method, apparatus and system implemented as software can be stored in one or more non-transitory memory storage devices in an executable format to be executed by one or more processors. The computer readable medium may be non-transitory and does not include radio or other carrier waves. The computer readable medium could be, for example, a physical computer readable medium such as semiconductor memory or solid-state memory, magnetic tape, a removable computer diskette, a random-access memory (RAM), a read-only memory (ROM), a rigid magnetic disc, and an optical disk, such as a CD-ROM, CD-R/W or DVD.

The various methods described above may also be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

Computing Devices

Figure 9:
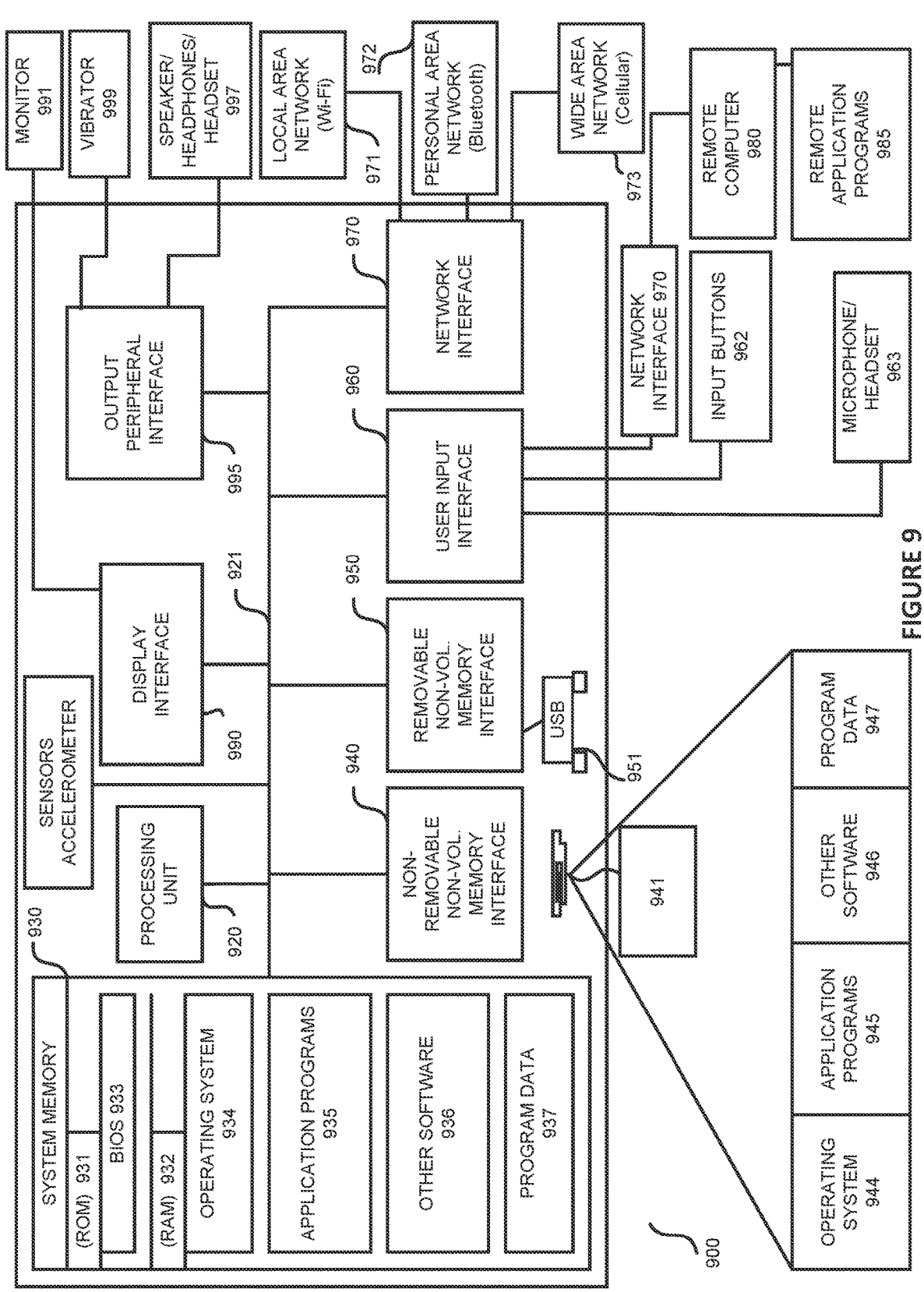
FIG. 9 illustrates a block diagram of an embodiment of one or more computing devices that can be a part of the Artificial Intelligence based cyber security system for an embodiment of the current design discussed herein.

FIG. 9 illustrates a block diagram of an embodiment of one or more computing devices that can be a part of an AI-based, cyber security system including the cyber security appliance 100, the restoration engine, the prediction engine, etc. for an embodiment of the current design discussed herein.

The computing device 900 may include one or more processors or processing units 920 to execute instructions, one or more memories 930-932 to store information, one or more data input components 960-963 to receive data input from a user of the computing device 900, one or more modules that include the management module, a network interface 970 (e.g., network interface communication circuit) to establish a communication link to communicate with other computing devices external to the computing device, one or more sensors where an output from the sensors is used for sensing a specific triggering condition and then correspondingly generating one or more preprogrammed actions, a display screen (monitor) 991 to display at least some of the information stored in the one or more memories 930-932 and other components. Note, portions of this design implemented in software 944, 945, 946 are stored in the one or more memories 930-932 and are executed by a processing unit 920. The processing unit 920 may include one or more processing cores, which couples to a system bus 921 that couples various system components including the system memory 930. The system bus 921 may be any of several types of bus structures selected from a memory bus, an interconnect fabric, a peripheral bus, and a local bus using any of a variety of bus architectures. The cyber security appliance 100 may feature some or all of these components, such as memory, processing unit, network interface, and the like within its architecture of FIG. 1.

Computing device 900 typically includes a variety of computing machine-readable media. Non-transitory machine-readable media can be any available media that can be accessed by computing device 900 and includes both volatile and nonvolatile media, and removable and non-removable media. By way of example, and not limitation, non-transitory machine-readable media use includes storage of information, such as computer-readable instructions, data structures, other executable software, or other data. Non-transitory machine-readable media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information, and which can be accessed by the computing device 900. Transitory media such as wireless channels are not included in the machine-readable media. Machine-readable media typically embody computer readable instructions, data structures, and other executable software. For example, a volatile memory drive 941 is illustrated for storing portions of software such as the operating system 944, application programs 945, other executable software 946, and program data 947.

A user may enter commands and information into the computing device 900 through input devices such as a keyboard, touchscreen, or software or hardware input buttons 962, a microphone 963, a pointing device and/or scrolling input component, such as a mouse, trackball, or touch pad 961. The microphone 963 can cooperate with speech recognition software. These and other input devices are often connected to the processing unit 920 through a user input interface 960 that is coupled to the system bus 921, but can be connected by other interface and bus structures, such as a lighting port, game port, or a universal serial bus (USB). A display monitor 991 or other type of display screen device is also connected to the system bus 921 via an interface, such as a display interface 990. In addition to the monitor 991, computing devices may also include other peripheral output devices such as speakers 997, a vibration device 999, and other output devices, which may be connected through an output peripheral interface 995.

The computing device 900 can operate in a networked environment using logical connections to one or more remote computers/client devices, such as a remote computing device 980. The remote computing device 980 can a personal computer, a mobile computing device, a server, a router, a network PC, a peer device, or other common network node, and typically includes many or all of the elements described above relative to the computing device 900. The logical connections can include a personal area network (PAN) 972 (e.g., Bluetooth®), a local area network (LAN) 971 (e.g., Wi-Fi), and a wide area network (WAN) 973 (e.g., cellular network). Such networking environments are commonplace in offices, enterprise-wide computer networks, intranets, and the Internet. A browser application and/or one or more local apps may be resident on the computing device and stored in the memory.

When used in a LAN networking environment, the computing device 900 is connected to the LAN 971 through a network interface 970, which can be, for example, a Bluetooth® or Wi-Fi adapter. When used in a WAN networking environment (e.g., Internet), the computing device 900 typically includes some means for establishing communications over the WAN 973. With respect to mobile telecommunication technologies, for example, a radio interface, which can be internal or external, can be connected to the system bus 921 via the network interface 970, or other appropriate mechanism. In a networked environment, other software depicted relative to the computing device 900, or portions thereof, may be stored in the remote memory storage device. By way of example, and not limitation, remote application programs 985 as reside on remote computing device 980. It will be appreciated that the network connections shown are examples and other means of establishing a communications link between the computing devices that may be used. It should be noted that the present design can be conducted on a single computing device or on a distributed system in which different portions of the present design are conducted on different parts of the distributed computing system.

In certain situations, each of the terms "engine," "module" and "component" is representative of hardware, firmware, and/or software that is configured to perform one or more functions. As hardware, the engine (or module or component) may include circuitry having data processing and/or storage functionality. Examples of such circuitry may include, but are not limited or restricted to a processor, a programmable gate array, a microcontroller, an application specific integrated circuit, wireless receiver, transmitter and/or transceiver circuitry, semiconductor memory, or combinatorial logic. Alternatively, or in combination with the hardware circuitry described above, the engine (or module or component) may be software in the form of one or more software modules, which may be configured to operate as its counterpart circuitry. For instance, a software module may be a software instance that operates as or is executed by a processor, namely a virtual processor whose underlying operations is based on a physical processor such as virtual processor instances for Microsoft® Azure® or Google® Cloud Services platform or an EC2 instance within the Amazon® AWS infrastructure, for example. Illustrative examples of the software module may include an executable application, a daemon application, an application programming interface (API), a subroutine, a function, a procedure, an applet, a servlet, a routine, source code, a shared library/dynamic load library, or simply one or more instructions.

A "module" may be implemented in hardware electronic components, software components, and a combination of both. A module is a core component of a complex system consisting of hardware and/or software that is capable of performing its function discretely from other portions of the entire complex system but designed to interact with the other portions of the entire complex system.

The term "message" generally refers to as information placed in a prescribed format that is transmitted in accordance with a suitable delivery protocol or accessible through a logical data structure such as an Application Programming Interface (API) or a web service or service such as a portal. Examples of a message may include one or more packets, frames, header/body data structure (e.g., electronic mail "email" structure, etc.), or any other series of bits having the prescribed, structured format.

The "term" coupled is defined as meaning connected either directly to the component or indirectly to the component through another component.

The term "computerized" generally represents that any corresponding operations are conducted by hardware in combination with software and/or firmware. The terms "computing device" should be generally construed as network-based module with data processing capability, data storage capability, and/or a capability of connecting to any type of network, such as a public cloud network, a private cloud network, or any other network type. Examples of a computing device may include, but are not limited or restricted to, the following: a server, a router or other intermediary communication device, or a consumer electronic (e.g., a laptop, a smartphone, a tablet, a desktop computer, a netbook, IoT device, networked wearable, etc.).

The term "instance" may be software, such as container, process, thread, virtual machine, code, or the like.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Note, an application described herein includes but is not limited to software applications, mobile applications, and programs routines, objects, widgets, plug-ins that are part of an operating system application. Some portions of this description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as Python, C, C++, Java, HTTP, or other similar languages. Also, an algorithm can be implemented with lines of code in software, configured logic gates in hardware, or a combination of both. In an embodiment, the logic consists of electronic circuits that follow the rules of Boolean Logic, software that contain patterns of instructions, or any combination of both. Note, many functions performed by electronic hardware components can be duplicated by software emulation. Thus, a software program written to accomplish those same functions can emulate the functionality of the hardware components in the electronic circuitry.

Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. A cyber security appliance for detecting and disabling malicious endpoints, comprising:
   one or more input/output (I/O) ports to receive information associated with one or more endpoints including a first endpoint; and
   a non-transitory memory storage device including software executable by one or more processors, the software comprises an artificial intelligence-based (AI-based) detect component and an inoculation module wherein the AI-based detect component configured to receive the information and determine, based on a portion of the information, whether the first endpoint constitutes a malicious endpoint by being responsible for or associated with a cyber threat against an enterprise protected by the cyber security appliance, and wherein the inoculation module in communication with the AI-based detect component, the inoculation module includes an inoculation extension, wherein the inoculation extension includes (1) a nomination module configured to request authorization to launch an offensive countermeasure against the malicious endpoint, (2) a disablement module to conduct the offensive countermeasure against the malicious endpoint to disable network communications by the malicious endpoint upon receiving the authorization, and (3) a confirmation module operating with a fingerprint module to generate a fingerprint in which content of the fingerprint is used to verify the malicious endpoint, wherein the fingerprint is based on a hash result performed on at least (i) configuration parameters of the malicious endpoint, and one or more of (ii) data obtained from full port scan of the malicious endpoint and (iii) infrequent or rare byte sequences.

2. The cyber security appliance of claim 1, wherein the disablement module of the inoculation module is configured to disable network communications for the malicious endpoint by at least disabling or continuously disrupting network connection availability by the malicious endpoint.

3. The cyber security appliance of claim 2, wherein the inoculation module is disabling or continuously disrupting network connection availability by the malicious endpoint by at least conducting a Denial-of-Service (DoS) attack by establishing communication sessions with the malicious endpoint and continuing to maintain the communication sessions in an attempt to exhaust all available sockets used by the malicious endpoint for network communications.

4. The cyber security appliance of claim 3, wherein the disablement module of the inoculation module includes a master component and a plurality of slave components, the master component is a software instance configured to receive and distribute network addressing information associate with the malicious endpoint to the plurality of slave components and each of the plurality of slave components is a software instance configured to establish a communication session of the communication sessions with a socket of the available sockets associated with the malicious endpoint.

5. The cyber security appliance of claim 4, wherein each slave component of the plurality of slave components is configured to maintain its communication session with the malicious endpoint through low-throughput data exchange with a maximum throughput of less than 500 kilobytes per second (kbps).

6. The cyber security appliance of claim 4, wherein each slave component of the plurality of slave components is configured to establish a communication session with the malicious endpoint via an anonymity server.

7. The cyber security appliance of claim 1, wherein the content of the fingerprint is used to verify the malicious endpoint operating as a malicious server as well as other servers related to the malicious server.

8. The cyber security appliance of claim 1, wherein the offensive countermeasure is an attempt to disable operability of a malicious server utilized to provide communications for a malicious endpoint used by a malicious actor, where the offensive countermeasure is a Denial-of-Service (DoS) attack on the malicious server by exhausting its available sockets.

9. The cyber security appliance of claim 1, wherein the fingerprint is delivered to other cyber security appliances associated with different domains to assist in disabling the malicious endpoint.

10. The cyber security appliance of claim 1, wherein the AI-based detect component comprises a cyber threat analyst module that operates in cooperation with AI models and AI classifiers to analyze the portion of the information associated with the first endpoint to determine that the first endpoint constitutes a malicious endpoint in response to detection of behaviors of the first endpoint that correlate with characteristics of a cyber threat recognized by at least one of the AI models.

11. A non-transitory storage medium configured to store instructions that are configured, when executed, to detect and disable malicious endpoints, comprising:

an artificial intelligence-based (AI-based) detect component configured, when executed, to determine a cyber threat based on information sourced by a first endpoint and classify the first endpoint as a malicious endpoint; and an inoculation module in communication with the AI-based detect component, the inoculation module includes an inoculation extension, wherein the inoculation extension includes (1) a nomination module configured to request authorization to launch an offensive countermeasure against the malicious endpoint, (2) a disablement module to coordinate the offensive countermeasure against the malicious endpoint to disable or continuously disrupt network connection availability for the malicious endpoint upon receiving the authorization, and (3) a confirmation module operating with a fingerprint module to generate a fingerprint in which content of the fingerprint is used to verify the malicious endpoint, wherein the fingerprint is based on a hash result performed on at least (i) configuration parameters of the malicious endpoint and one or more of (ii) data obtained from full port scan of the malicious endpoint and (iii) infrequent or rare byte sequences.

12. The non-transitory storage medium of claim 11, wherein the disablement module of the inoculation module is configured to disable or continuously disrupt network connection availability by the malicious endpoint by conduct a Denial-of-Service (DoS) attack by establishing communication sessions with the malicious endpoint and continuing to maintain the communication sessions in an attempt to exhaust all available sockets used by the malicious endpoint for network communications.

13. The non-transitory storage medium of claim 12, wherein the disablement module of the inoculation module includes a master component and a plurality of slave components, the master component is a software instance configured to receive and distribute network addressing information associate with the malicious endpoint to the plurality of slave components and each of the plurality of slave components is a software instance configured to establish a communication session of the communication sessions with a socket of the available sockets associated with the malicious endpoint.

14. The non-transitory storage medium of claim 13, wherein each slave component of the plurality of slave components is configured to maintain its communication session with the malicious endpoint through low-throughput data exchange with a maximum throughput of less than 500 kilobytes per second (kbps).

15. The non-transitory storage medium of claim 13, wherein each slave component of the plurality of slave components is configured to establish a communication session with the malicious endpoint via an anonymity server.

16. The non-transitory storage medium of claim 11, wherein the AI-based detect component is configured to perform a plurality of levels of investigations on the information to determine the cyberthreat in which a first level of investigation is adapted to detect overt cyber threats over a first period of time and a second level of investigation is adapted to detect advanced persistent cyber threats through analysis of low-level anomalies over a second period of time greater than the first period of time.

17. The non-transitory storage medium of claim 11, wherein the fingerprint is delivered to other cyber security appliances associated with different domains to assist in disabling the malicious endpoint.

18. The non-transitory storage medium of claim 11, wherein the AI-based detect component comprises a cyber threat analyst module that operates in cooperation with AI models and AI classifiers to analyze a portion of the information associated with the first endpoint to determine that the first endpoint operates as a malicious endpoint in response to detection of behaviors of the first endpoint that correlate with characteristics of a cyber threat recognized by at least one of the AI models.

19. A computerized method for detecting and disabling malicious endpoints, comprising:

receiving information associated with one or more endpoints including a first endpoint;

determining, based on conducting analytics on a portion of the information by a cyber security appliance, whether the first endpoint constitutes a malicious endpoint by at least generating at least a fingerprint in which content of the fingerprint is used to verify the malicious endpoint, wherein the fingerprint is based on a hash result performed on at least (i) configuration parameters of the malicious endpoint and one or more of (ii) data obtained from full port scan of the malicious endpoint and (iii) infrequent or rare byte sequences; and responsive to detecting the malicious endpoint, request authorization to launch an offensive countermeasure against the malicious endpoint, and conducting the offensive countermeasure against the malicious endpoint by at least continuously disrupting or disabling communications over a network utilized by the malicious endpoint upon receiving the authorization.

* * * * *